US011002985B2

(12) United States Patent
Matsushima et al.

(10) Patent No.: US 11,002,985 B2
(45) Date of Patent: *May 11, 2021

(54) DISPLAY DEVICE, ELECTRONIC APPARATUS AND DISPLAY METHOD

(71) Applicant: TIANMA MICROELECTRONICS CO., LTD., Shenzhen (CN)

(72) Inventors: Jin Matsushima, Kanagawa (JP); Koji Shigemura, Kanagawa (JP); Yukie Keicho, Kanagawa (JP); Tetsushi Sato, Kanagawa (JP)

(73) Assignee: TIANMA MICROELECTRONICS CO., LTD., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 16/778,655

(22) Filed: Jan. 31, 2020

(65) Prior Publication Data

US 2020/0166772 A1    May 28, 2020

Related U.S. Application Data

(63) Continuation of application No. 16/034,946, filed on Jul. 13, 2018, now Pat. No. 10,585,295.

(30) Foreign Application Priority Data

Jul. 13, 2017 (JP) .............................. JP2017-137228
Apr. 13, 2018 (JP) .............................. JP2018-077983

(51) Int. Cl.
*G02B 30/25* (2020.01)
*G02B 27/60* (2006.01)
(Continued)

(52) U.S. Cl.
CPC ............... *G02B 30/25* (2020.01); *G02B 3/14* (2013.01); *G02B 27/60* (2013.01); *G02B 30/27* (2020.01); *G09G 2320/0242* (2013.01)

(58) Field of Classification Search
CPC .......... G02B 30/25; G02B 30/27; G02B 3/14; G02B 27/60; G09G 2320/0242; G02F 1/133512; G02F 1/29
See application file for complete search history.

(56) References Cited

U.S. PATENT DOCUMENTS

2003/0214497 A1   11/2003   Morishima
2006/0146208 A1    7/2006   Kim
(Continued)

FOREIGN PATENT DOCUMENTS

JP    2013-55695 A    3/2013
JP    2014-41355 A    3/2014

*Primary Examiner* — Tracy Y. Li
(74) *Attorney, Agent, or Firm* — Nixon & Vanderhye

(57) ABSTRACT

A display device includes a display panel including a plurality of pixels arrayed along first and second directions, a distribution unit that distributes light emitted from each pixel configured to display a parallax image corresponding to each of a plurality of viewpoints, and a light blocking unit between the display panel and the distribution unit. The distribution unit distributes light emitted from each of the pixels to the plurality of viewpoints along the first direction in a first display state where the display panel displays a parallax image, or stops distributing emitted light in a second display state, displaying a planar image. The light blocking unit forms, along the first direction, a plurality of first light blocking areas each extending along the second direction blocking some emitted light in the first display state, and stops forming the first light blocking areas in the second display state.

14 Claims, 39 Drawing Sheets

(51) Int. Cl.
G02B 3/14 (2006.01)
G02B 30/27 (2020.01)

(56) References Cited

U.S. PATENT DOCUMENTS

2008/0094700 A1* 4/2008 Uehara ................ G02B 5/0257
 359/463
2009/0167846 A1 7/2009 Niioka
2013/0258057 A1* 10/2013 Mishima ................ G02B 30/27
 348/46
2014/0022619 A1 1/2014 Woodgate
2014/0313463 A1* 10/2014 Jang .................. G02F 1/136209
 349/106

* cited by examiner

FIG. 1
RELATED ART
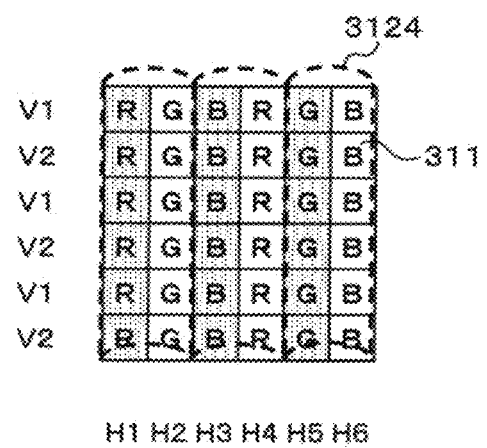
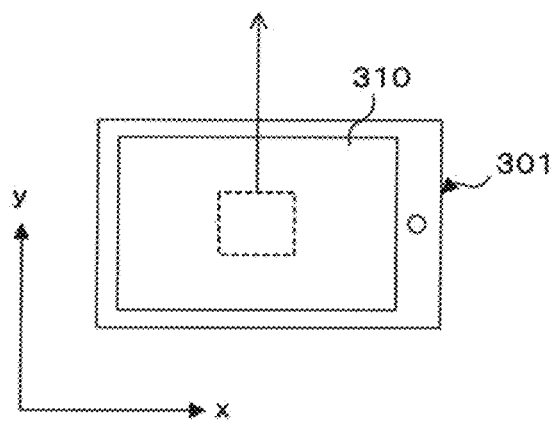

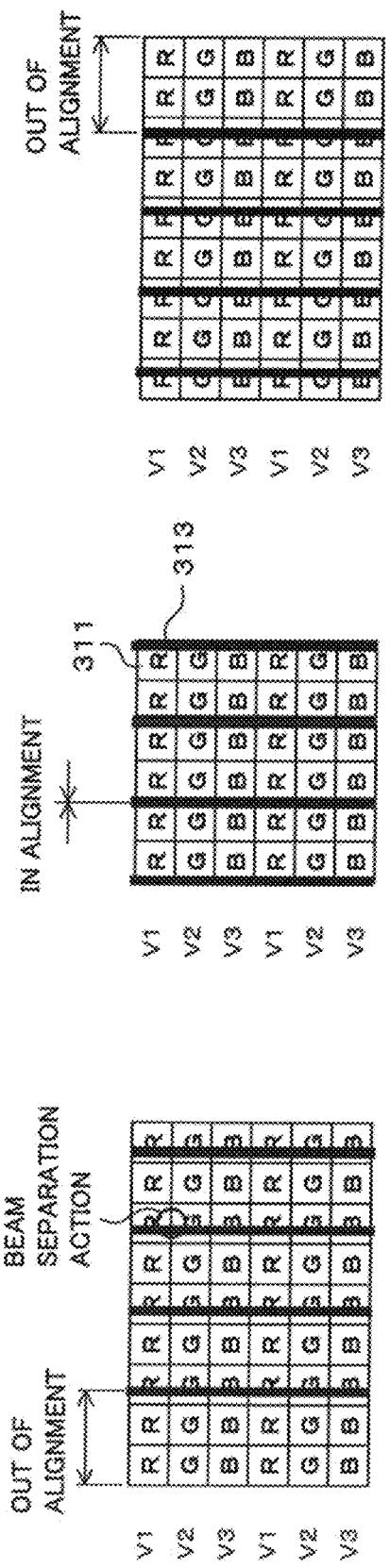
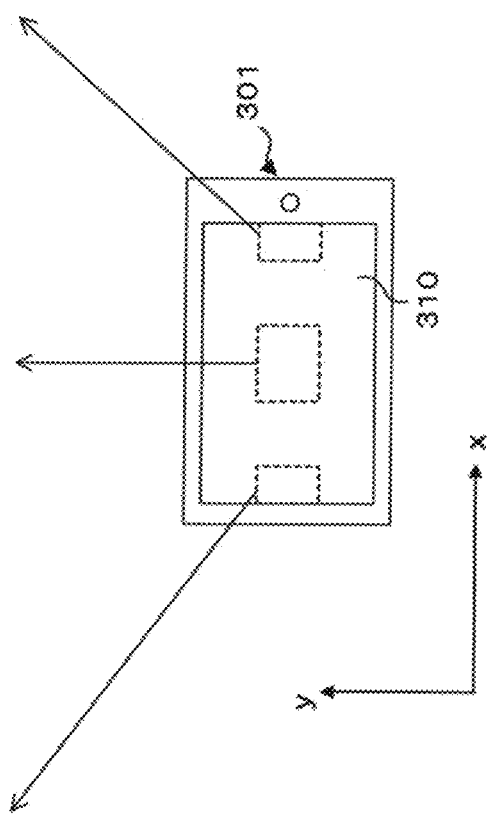
FIG. 7 RELATED ART

F I G. 15
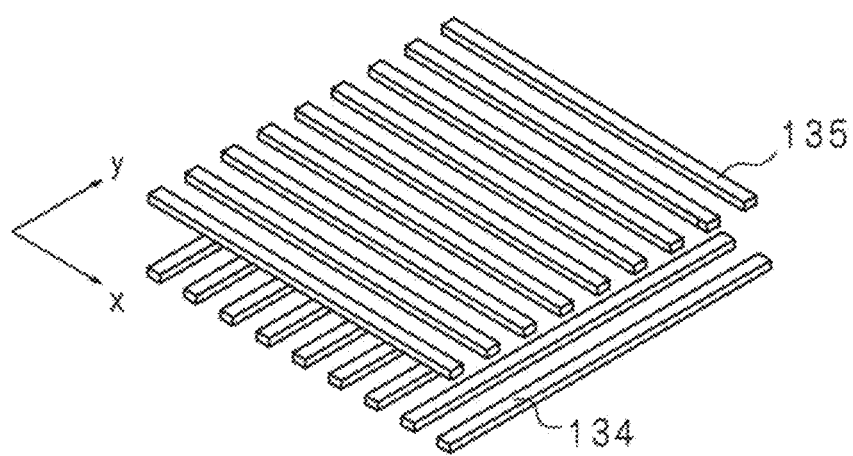

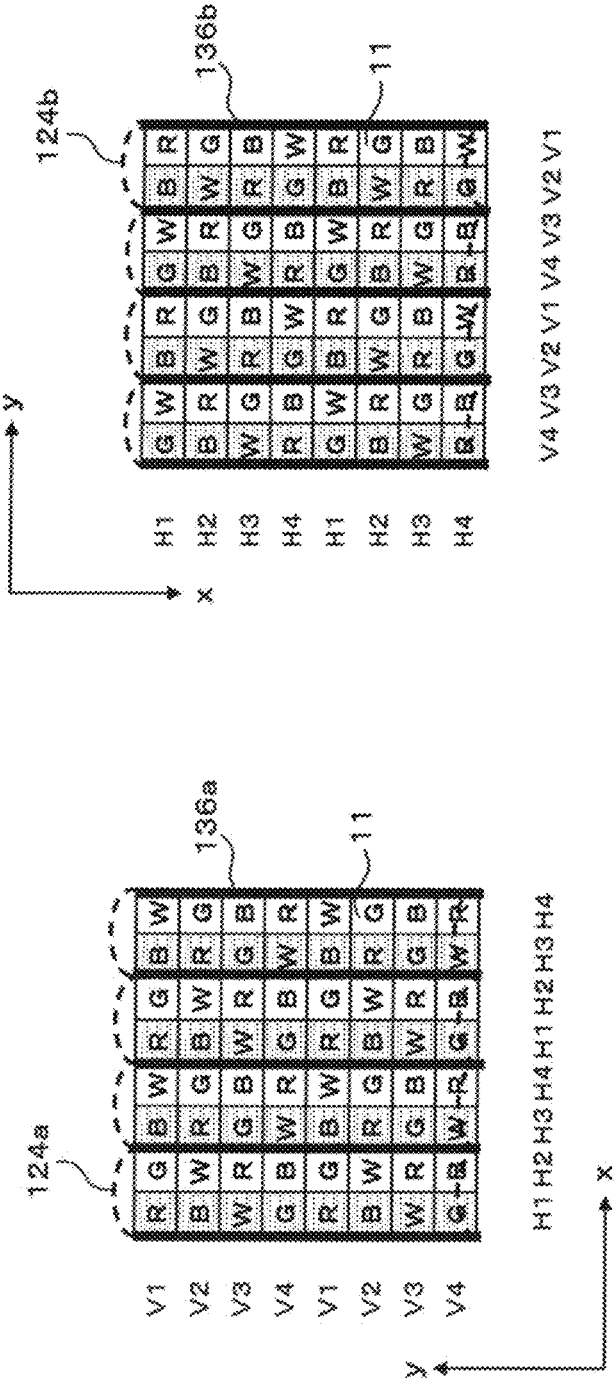

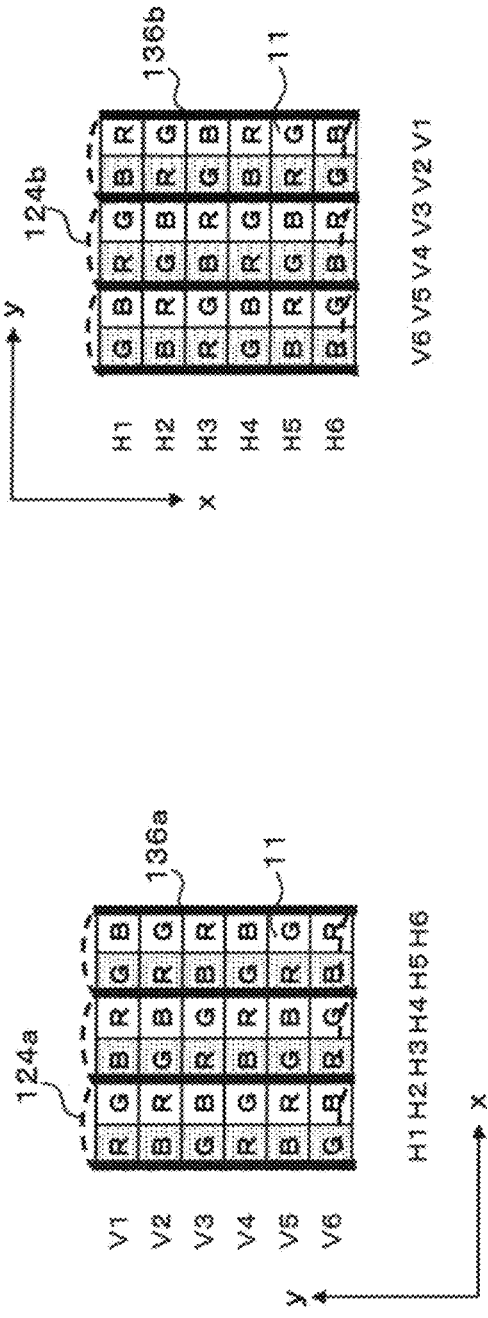

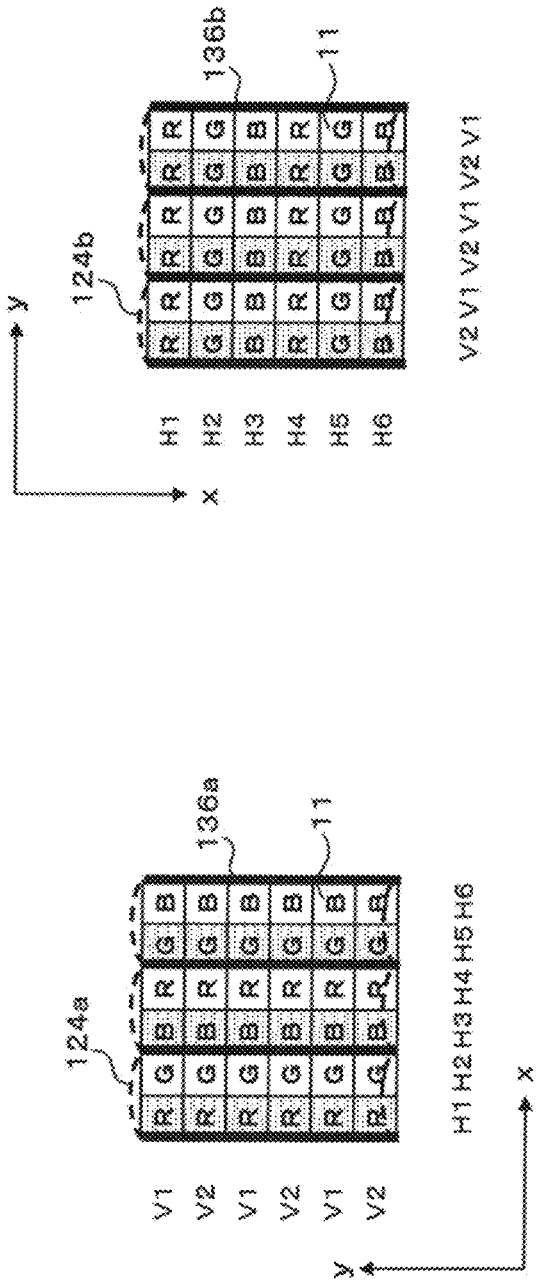

DISPLAY DEVICE, ELECTRONIC APPARATUS AND DISPLAY METHOD

CROSS-REFERENCE TO RELATED APPLICATIONS

This application is a continuation of application Ser. No. 16/034,946 filed on Jul. 13, 2018, which claims foreign priority to Japanese Patent Application No. 2017-137228 filed in Japan on Jul. 13, 2017 and Japanese Patent Application No. 2018-77983 filed in Japan on Apr. 13, 2018, the entire contents of which are hereby incorporated by reference.

FIELD

The present disclosure relates to a display device, an electronic apparatus and a display method.

BACKGROUND

A display device displaying a three-dimensional stereoscopic image without using glasses for three-dimensional stereoscopic display has been proposed (for example, Japanese Patent Application Laid-Open No. 2013-55695 and Japanese Patent Application Laid-Open No. 2014-41355). Furthermore, a display device with a function of displaying a three-dimensional stereoscopic image or a two-dimensional image (hereinafter, appropriately referred to as a 3D display device) has been proposed.

The three-dimensional stereoscopic image display is called "3D (dimension) display" while the two-dimensional image display is called "2D display."

For a 3D display device, degradation in image quality may occur due to unevenness of display color, so-called color moire, at the time of 2D display.

SUMMARY

One aspect of the display device according to the disclosure comprises a display panel including a plurality of pixels that are arrayed along a first direction and a second direction and that are configured to display a parallax image or a planar image; a distribution unit that distributes light emitted from each pixel configured to display a parallax image corresponding to each of a plurality of viewpoints; and a light blocking unit that is disposed between the display panel and the distribution unit and that blocks part of the emitted light, and the distribution unit distributes light emitted from each of the pixels to the plurality of viewpoints along the first direction in a first display state where the display panel displays a parallax image, or stops distributing emitted light in a second display state where the display panel displays a planar image, and the light blocking unit forms, along the first direction, a plurality of first light blocking areas each extending along the second direction that block part of the emitted light in the case of the first display state, and stops forming the first light blocking areas in the case of the second display state.

It is to be understood that both the foregoing general description and the following detailed description are exemplary and explanatory and are not restrictive of this disclosure.

BRIEF DESCRIPTION OF THE DRAWINGS

FIG. 1 simply depicts 3D display.
FIG. 7 depicts a problem for the related art.
FIG. 15 depicts an example of the configuration of electrodes.
FIG. 16A and FIG. 16B simply depict 3D display.
FIG. 18A and FIG. 18B simply depict 2D display.
FIG. 20A and FIG. 20B are illustrative views of other examples of array patterns of pixels.
FIG. 22A and FIG. 22B are illustrative views of examples of array patterns of sub pixels concerning the three primary colors.
FIG. 23A and FIG. 23B are illustrative views of other examples of array patterns of sub pixels concerning the three primary colors.

DETAILED DESCRIPTION

The present invention will be described in detail with reference to the drawings illustrating embodiments.

First, as a related art being a precondition of the present embodiments, description is made on a display device 310 that is mounted on an electronic apparatus 301 and has functions of performing 3D display or 2D display and of performing landscape display or portrait display.

Figure 2:
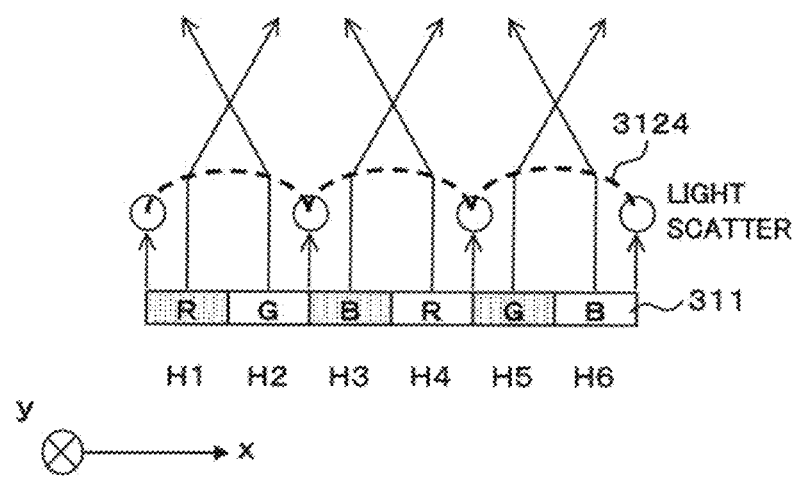
FIG. 2 simply depicts 3D display.

Referring now to FIG. 1 and FIG. 2, 3D display will be described. FIG. 1 and FIG. 2 simply depict 3D display. FIG. 1 and FIG. 2 illustrate the display screen of the display device 310 when it performs 3D display with a partial area schematically extracted from the display screen. Note that the schematic diagram of the electronic apparatus 301 is depicted together at the lower part of FIG. 1. FIG. 1 illustrates a front view of this area while FIG. 2 illustrates a cross-sectional view when viewed from the inside of the display surface.

The electronic apparatus 301 is a smartphone, a tablet-type device, a personal computer, a mobile phone or the like, though not limited thereto, but any electronic apparatus equipped with the display device 310. The following description will be made assuming that the electronic apparatus 301 is a smartphone.

The display device 310 is a display device such as a liquid crystal display or an organic light emitting diode display (OLED). The following description will be made assuming that the display device 310 is a liquid crystal display device. The display device 310 has a rectangular display surface, for example, on which an image is to be displayed. Note that a side of the display device 310 on which the display surface is provided is regarded as a front side while the opposite side thereto is regarded as a back side. Here, a direction along one side of the display surface is regarded as a first direction x while the direction along the other side crossing the first direction x is regarded as a second direction y. More specifically, as illustrated at the lower part of FIG. 1, a direction along the long side of the display surface is regarded as the first direction x while a direction along the short side is regarded as the second direction y. Furthermore, as illustrated in FIG. 1, the state where the electronic apparatus 301 is placed with the second direction y set as a vertical direction is called a horizontal (i.e., landscape) posture. Unlike FIG. 1, the state where the electronic apparatus 301 is placed with the first direction x set as a vertical direction is called a vertical (i.e., portrait) posture (see FIG. 9B).

The display device 310 is provided with a display panel 311 having multiple 3D pixels arrayed along the first direction x and the second direction y. Here, there are groups of sub pixels for forming right eye viewpoint images and left eye viewpoint images. When one group of sub pixels disables white display, it can be defined as a 3D pixel. In contrast, when one group of sub pixel enables white display, it can be defined as a pixel. More specifically, as illustrated in FIG. 1, 3D pixels each including multiple sub pixels are arrayed along the first direction x and the second direction y. FIG. 1 depicts sub pixels each concerning one of the primary colors are arrayed, assuming that the display panel 311 displays the three primary colors of RGB (R: red, G: green, B: blue). In FIG. 1, for purposes of description, sub pixels along the first direction x are numbered H1 to H6 while sub pixels along the second direction y are numbered V1, V2 .... In FIG. 1, each 3D pixel consists of sub pixels of 2×1 including two columns (H1 and H2, H3 and H4, or H5 and H6) in the first direction x and one column (V1 or V2) in the second direction y. That is, FIG. 1 illustrates 3D pixels of 3×6. In FIG. 1, on the display panel 311, sub pixels each having R, G or B of the primary colors are alternately arranged in this order along the first direction x while all the sub pixels arranged along the second direction y has a uniform color of any one of R, G and B. In FIG. 1, one 3D pixel is not able to display an arbitrary color while multiple 3D pixels together may display an arbitrary color when subjected to image processing.

In the case of 3D display, the display panel 311 displays a parallax image for each viewpoint along the first direction x or the second direction y. In the example depicted in FIG. 1, the display panel 311 alternately displays a parallax image for right eye and a parallax image for left eye along the first direction x. As illustrated in FIG. 1, for example, the display panel 311 alternately displays a right eye image (image displayed by the sub pixel that is hatched) and a left eye image (image displayed by the sub pixel that is not hatched) at an array pitch corresponding to one column of a sub pixel along the first direction x.

The display device 310 includes an optical element that distributes a parallax image for each viewpoint to be displayed on the display panel 311 to the viewpoints of the observer. The optical element is a liquid crystal lens, for example. Note that the optical element is, without being limited to the liquid crystal lens, only required to have a function of distributing a parallax image for each viewpoint to the viewpoints of the observer by electrowetting, moving of optical components, charging or discharging gas or liquid to a transparent contracting member or the like. The following description is made assuming that the optical element is a liquid crystal lens (not illustrated in FIG. 1 and FIG. 2) that makes a light beam separation direction dynamically switchable in accordance with the display orientation of the parallax images on the display panel 311. The liquid crystal lens is placed in front of the display panel 311, and a liquid crystal layer is configured to be sealed between two sheets of electrode substrates that face each other. The liquid crystal molecules in the liquid crystal layer are aligned depending on the voltage applied across the substrates to allow the liquid crystal lens to function as a pseudo optical lens. In the case where the liquid crystal lens is switchable between ON and OFF, the display device 310 turns the liquid crystal lens off at the time of 2D display.

The display device 310 drives the liquid crystal lens to form a lens-shaped refractive index profile that protrudes toward the front side, that is, a separation area 3124 indicated by dashed lines in FIG. 1. As illustrated in FIG. 1, the separation area 3124 is formed to have substantially the same width as the display width of a pair of the right eye image and the left eye image so as to extend along the second direction y. By forming multiple separation areas 3124 along the first direction x, a lenticular-lens-like refractive index profile in which multiple cylindrical lenses extending along the second direction y are arranged along the first direction x is formed as illustrated in FIG. 1 and FIG. 2. As indicated by arrows in FIG. 2, the separation area 3124 distributes light emitted from the display panel 311 and incident to the liquid crystal lens to two viewpoints located along the first direction x. If the right eye and the left eye of the observer are positioned along the first direction x, the emitted light beams concerning the right eye images and the left eye images are incident to the right eye and the left eye of the observer, respectively. This allows the observer to stereoscopically perceive a display image.

In the configuration illustrated in FIG. 1 and FIG. 2, however, display characteristics may degrade at the boundary portions between the separation areas 3124. That is, as illustrated in FIG. 2, due to alignment disorder of liquid crystal molecules in the liquid crystal lens, light emitted from the display panel 311 is prone to scatter at the boundary portions between the separation areas 3124. Thus, the display characteristics are prone to degrade at this area.

Figure 3:
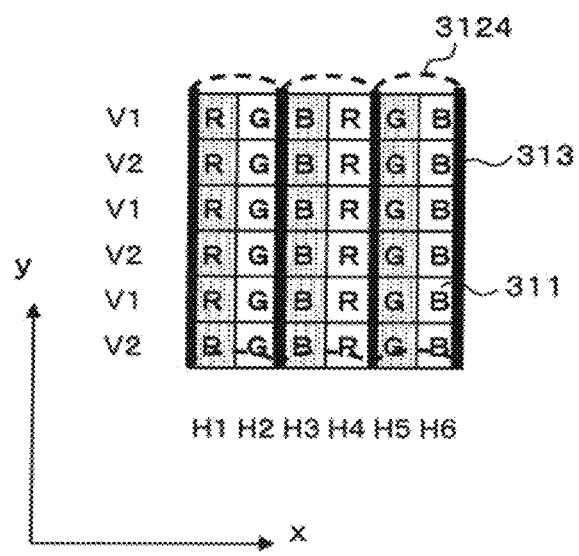
FIG. 3 is an example of the configuration of a display device provided with a light blocking member.
Figure 4:
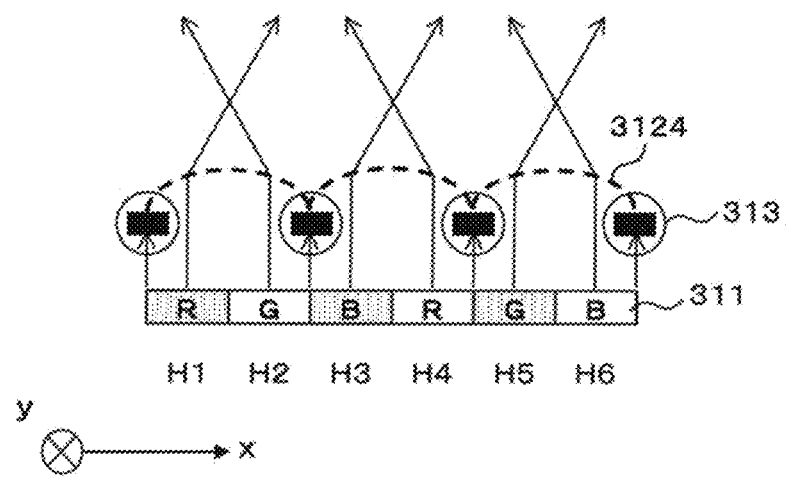
FIG. 4 is an example of the configuration of the display device provided with the light blocking member.

To solve the problem, a light blocking member such as a black matrix or the like may be provided at each of the boundary portions between the separation areas 3124. FIG. 3 and FIG. 4 depict examples of configurations in the case where the light blocking members 313 are provided. As indicated by bold lines in FIG. 3, the light blocking member 313 is an elongated rectangular member, for example, and placed between the display panel 311 and the liquid crystal lens. More specifically, multiple light blocking members 313 are provided in stripes along the second direction y so as to cover the boundaries between the separation areas 3124. Thus, the light emitted from the display panel 311 and incident to the boundary areas can be blocked, which solves the above-described problem.

Figure 5:
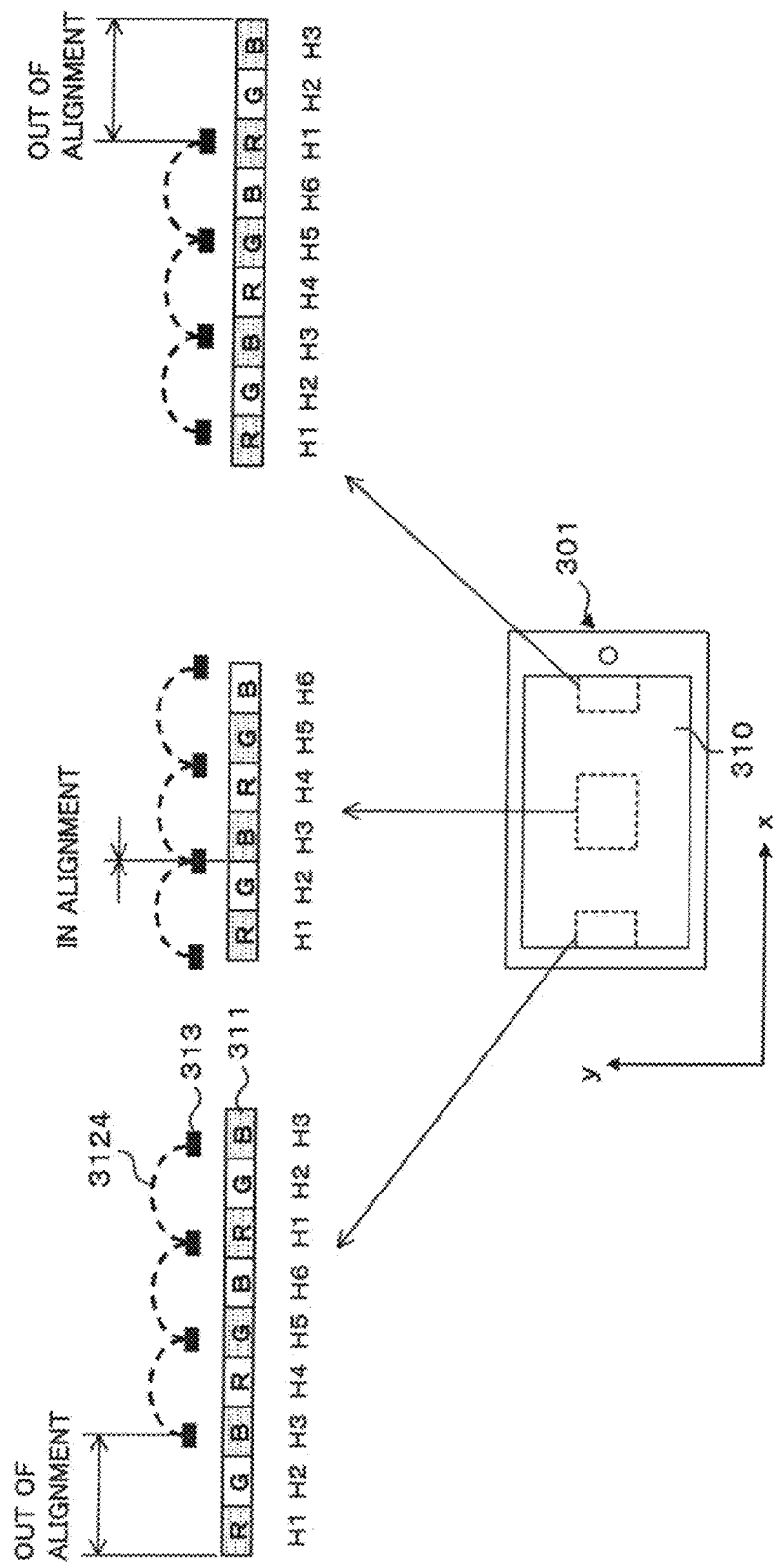
FIG. 5 depicts a problem for a related art.
Figure 6:
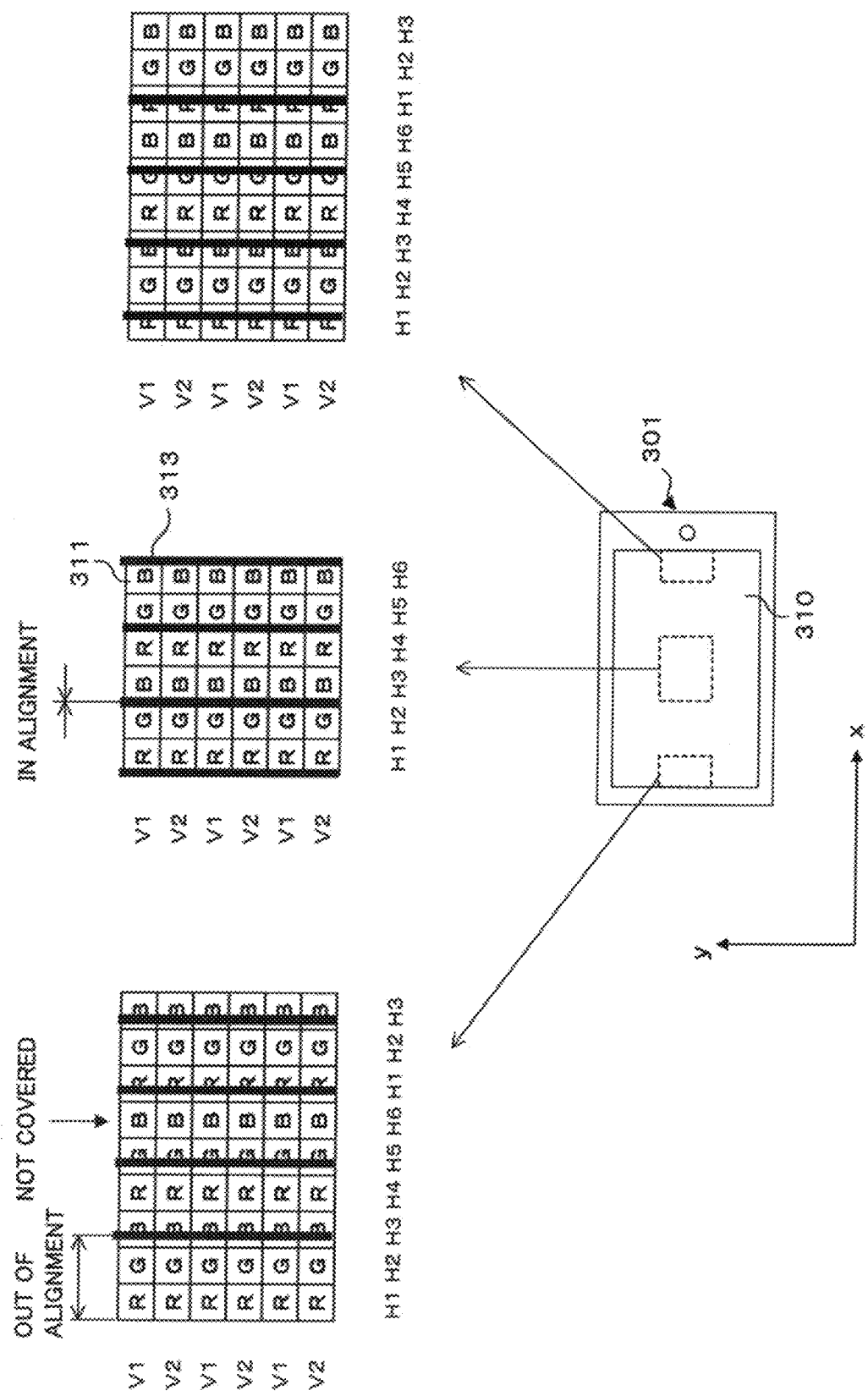
FIG. 6 depicts a problem for the related art.

In the case where the light blocking members 313 are provided as illustrated in FIG. 3 and FIG. 4, however, the inventors of the present application found the following problems. FIG. 5 and FIG. 6 depict the problem for related arts.

FIG. 5 illustrates the display screen with the central area and right and left end areas extracted when the display device 310 performs 3D display. Similarly to FIG. 4 or the like, FIG. 5 depicts at the upper part a cross-sectional view when the central areas and the right and left end areas of the display screen are viewed from the inside of the display screen.

In view of the actual design of the display device 310, the boundary between 3D pixels and the light blocking member 313 are not aligned with each other. FIG. 3 and FIG. 4 illustrate that the light blocking member 313 is positioned on the boundary between 3D pixels. In the actual display device 310, however, the forming width of the separation area 3124 is designed to be slightly shorter than the array pitch of each 3D pixel since emitted light is collected at the optimum visible position for a stereoscopic image (generally, the position of the viewpoint on the normal extending from the center of the display panel 311). Hence, the light blocking member 313 provided at the boundary portion between the separation areas 3124 is also designed to be slightly shorter than the array pitch of each 3D pixel. Accordingly, as shown in FIG. 5, the boundary between 3D pixels is in alignment with the light blocking member 313 at the center of the display panel 311 while the boundary between 3D pixels is greatly out of alignment with the light blocking member 313 at the ends of the display panel 311.

Due to the misalignment as described above, color moire may occur when the display device 310 performs 2D display. FIG. 6 conceptually illustrates a state where the display device 310 performs 2D display without driving the liquid crystal lens. For the purposes of description, FIG. 6 depicts these display areas when viewed from the front at the upper part thereof unlike FIG. 5.

As depicted at the upper center in FIG. 5, the display device 310 turns the liquid crystal lens off when performing 2D display so as not to display the separation area 3124. Furthermore, the display device 310 uniformly displays a planar image along the first direction x without alternately displaying a parallax image for right eye and a parallax image for left eye.

Since the light blocking members 313 are provided, light emitted from each 3D pixel of the display panel 311 is partially blocked by the blocking members 313. At the center of the display panel 311, for example, sub pixels each having R, G or B are partially covered by the light blocking members 313. This causes degradation in brightness.

Meanwhile, at the center of the display panel 311, the boundaries between 3D pixels are in alignment with the light blocking members 313, and thus the 3D pixels are uniformly covered by the light blocking members 313 for each of the primary colors R, G and B. Accordingly, color moire does not occur at the center of the display panel 311.

In contrast, at the ends of the display panel 311, the boundaries between 3D pixels are greatly out of alignment with the light blocking members 313. Thus, as illustrated in FIG. 6, sub pixels that are not covered by the light blocking members 313 periodically appear. Accordingly, unevenness in the brightness of each of the primary colors R, G and B occurs, which may cause color moire.

FIG. 7 is an illustrative view illustrating a state where the direction in which sub pixels of the primary colors are arrayed is changed. FIG. 7 illustrates a state where the direction in which sub pixels each having R, G or B of the primary colors are arrayed is changed from that in FIG. 5. In FIG. 5, sub pixels each having R, G or B of the primary colors are alternately arranged along the first direction x while in FIG. 7 while they are alternately arranged along the second direction y.

In the example in FIG. 7, sub pixels each having R, G or B of the primary colors are alternately arranged along the second direction y, and the light blocking members 313 extend along the second direction y. Accordingly, the 3D pixels are uniformly covered by the light blocking members 313 for each of the primary colors R, G and B, which makes color moire less likely to occur.

The light blocking members 313, however, extending in the second direction y function as a parallax barrier. Thus, a light beam separation action works along the first direction x, though too small for the observer to stereoscopically perceive the planar image. The light beam separation action causes a phenomenon in which the light blocking members 313 are viewed in an enlarged manner at a certain degree of visible distance away from the display panel 311. Such a phenomenon is called "3D moire" below for the purposes of discrimination from color moire.

By the light beam separation action in the first direction x, pixels that are hardly visible may occur depending on the visual angle. Accordingly, the resolution varies depending on the visual angle.

Figure 8A:
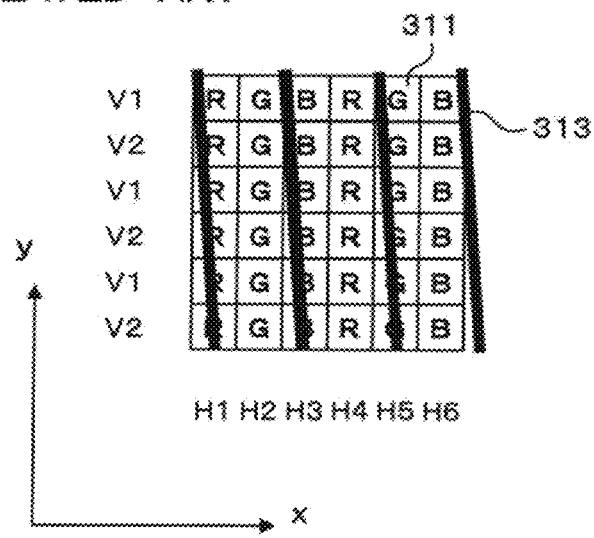
FIG. 8A and FIG. 8B depicts a problem for the related arts.
Figure 8B:
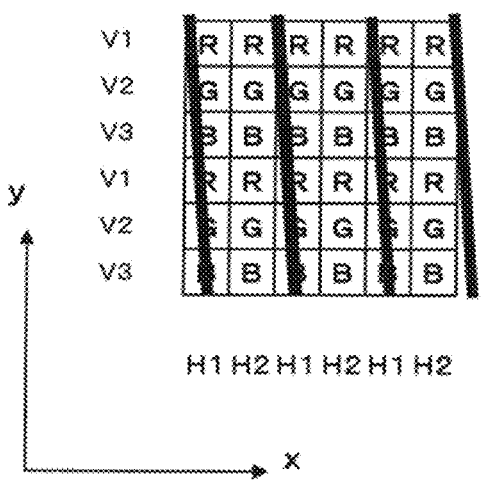

FIG. 8A and FIG. 8B is an illustrative view in the case where the extending direction of the separation area 3124 (although not illustrated) is changed at the time of 3D display. FIG. 8A and FIG. 8B respectively illustrate cases where the extending directions of the separation areas 3124 are tilted from those in FIG. 5 and FIG. 7. More specifically, the extending direction of the separation areas 3124 are tilted at a slight angle and shifted from the second direction y. In accordance with the extending directions of the separation areas 3124, the light blocking members 313 are also tilted at a slight angle and shifted from the second direction y for blocking the light emitted from the display panel 311 and incident to the boundary portion between the separation areas 3124. By tilting the light blocking members 313, the sub pixels each having primary color R, G or B are uniformly covered by the light blocking members 313 when the display panel 311 is viewed as a whole and thus, which may prevent color moire from occurring.

In the configuration depicted in FIG. 8A and FIG. 8B, however, a light beam separation action may work in the direction vertical to the extending direction of the light blocking member 313 due to the light blocking members 313. Accordingly, 3D moire described above may occur. Furthermore, similarly to FIG. 7, due to the work of the light beam separation action, pixels that are hardly visible may occur depending on the visual angle, and the resolution may vary.

The provision of the light blocking members 313 for 3D display may lead to degradation in brightness as well as color moire and 3D moire at the time of 2D display.

Figure 9A:
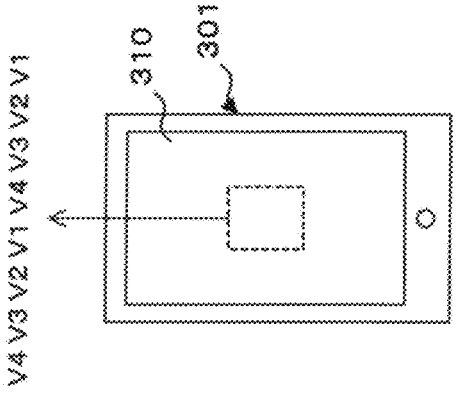
FIG. 9A and FIG. 9B respectively depict landscape display and portrait display.
Figure 9B:
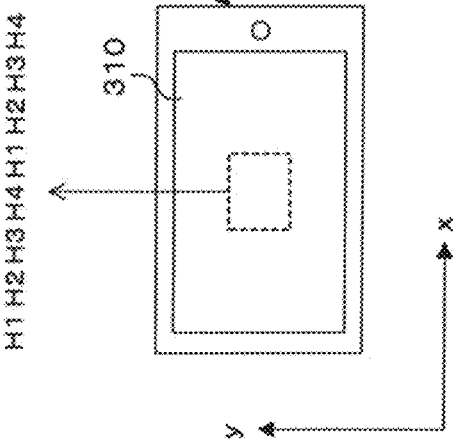

The following describes a case where switching between the landscape display and the portrait display as well as the switching between the 3D display and 2D display are performed, and the problem arising therefrom. FIG. 9A and FIG. 9B depict landscape display and portrait display. FIG. 9A depicts a case where the display device 10 is placed in a horizontal posture to perform the landscape display. FIG. 9B depicts a case where the display device 10 is placed in a vertical posture to perform the portrait display.

Unlike FIG. 1 to FIG. 7, FIG. 9A and FIG. 9B depict a case where the display panel 311 displays four primary colors including R, G, B plus W (white). In FIG. 9A and FIG. 9B, each pixel consists of sub pixels of 4×4 including four columns in the first direction x and four columns in the second direction y. That is, FIG. 9A and FIG. 9B depict pixels of 2×2. In FIG. 9A and FIG. 9B, for purposes of description, sub pixels along the first direction x are numbered H1 to H4 while sub pixels along the second direction y are numbered V1 to V4.

Note that the adjacent sub pixels along the first direction x and the second direction y are arranged to have different primary colors so as to achieve color compensation. By assigning different primary colors to the adjacent sub pixels along the x direction and the y direction, display unevenness in each pixel can be reduced.

The display device 310 switches the form of display to either the landscape display or the portrait display depending on the orientation of its own apparatus. More specifically, the display device 310 displays an image in a horizontal direction or a vertical direction depending on the placed state, whether it is placed in the horizontal posture or in the vertical posture. In the placed state illustrated at the lower part in FIG. 9A, for example, the display device 310 performs landscape display. In the placed state illustrated at the lower part in FIG. 9B, the display device 310 performs portrait display.

Description is first made on where 3D display is performed in the landscape form. In this case, the display device 310 drives the liquid crystal lens to form separation areas 3124. Here, the display device 310 switches the liquid crystal lens to a first distribution state in accordance with the landscape display where light emitted from each of the pixels of the display panel 311 is distributed along the first direction x. Thus, the emitted light concerning each of the parallax images is distributed to two viewpoints along the first direction x. More specifically, similarly to FIGS. 1 to 6, on the display device 310, the forming width of the separation areas 3124 is substantially the same as the display width of a pair of a right eye image and a left eye image, and a first separation areas 3124a extending along the second direction y are formed.

In the case of the portrait display, the display device 310 switches to a second distribution state where light emitted from each of the pixels is distributed along the second direction y. More specifically, as illustrated in FIG. 9B, the display device 310 switches the extending direction of the first separation area 3124a formed by the liquid crystal lens to the first direction x to form, along the second direction y, multiple second separation areas 3124b corresponding to a lenticular-lens-like refractive index profile. Thus, emitted light concerning each of the parallax images is distributed to two viewpoints along the second direction y.

It is noted that the first separation area 3124a and the second separation area 3124b are collectively referred to as a separation area 3124 below for convenience.

Even in the case where switching is made between the landscape display and the portrait display as illustrated in FIG. 9A and FIG. 9B, light emitted from the display panel 311 may scatter, which is likely to degrade the display characteristics due to alignment disorder of liquid crystal molecules at the boundary portions between the separation areas 3124. Here, the light blocking members 313 described above may be provided at the boundary between the separation areas 3124.

Since the display device 310 switches the distribution state of the liquid crystal lens depending on the display state of the display panel 311, the light blocking member 313 in a matrix is provided along the first direction x and the second direction y so as to cover the boundary between the first separation areas 3124a and the boundary between the second separation areas 3124b. Thus, light emitted from the display panel 311 and incident to the boundary portion is blocked in the landscape display as well as in the portrait display.

Figures 10A, 10B:
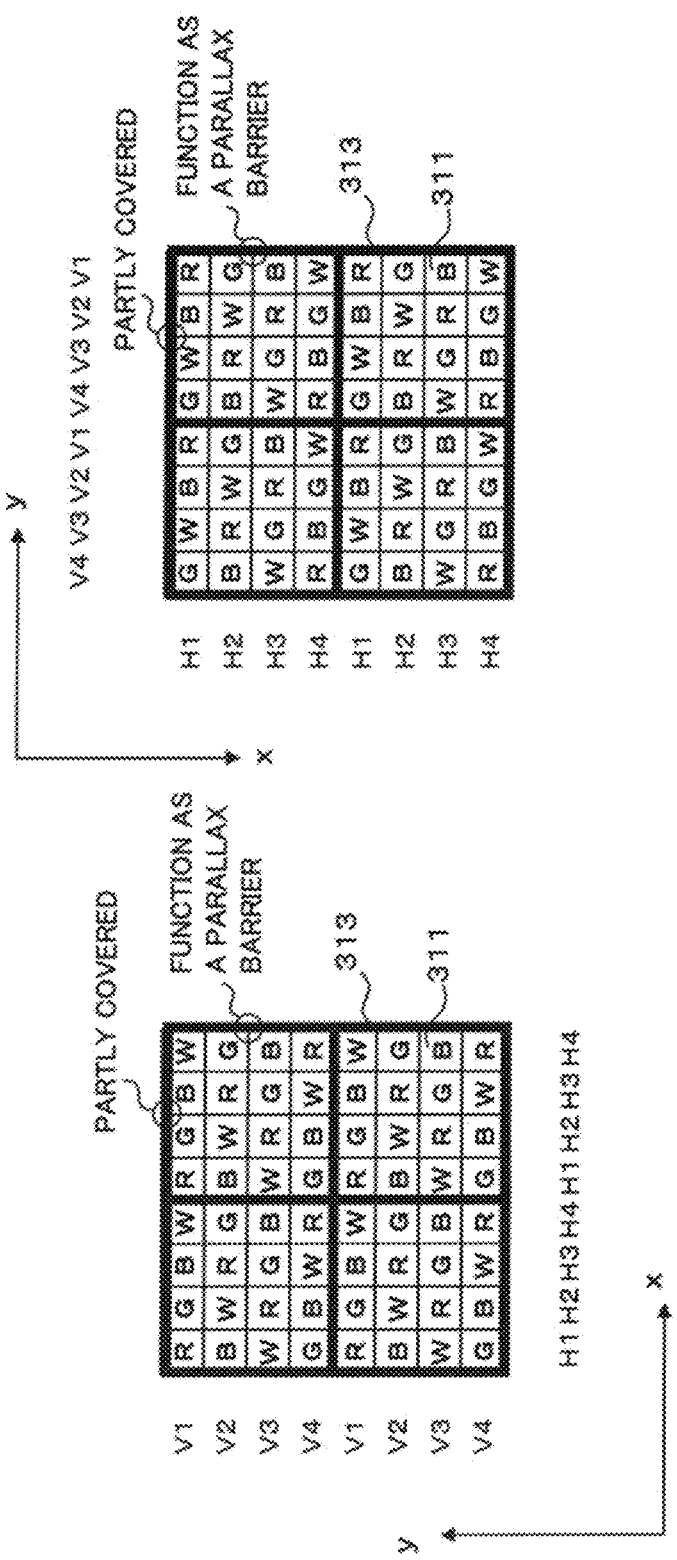
FIG. 10A and FIG. 10B depict a problem for the related art.

However, in the case where the light blocking members 313 are provided as illustrated in FIG. 9A and FIG. 9B, the inventors of the present application found the following problems. FIG. 10A and FIG. 10B depict a problem for the related art. FIG. 10A and FIG. 10B conceptually depict a state where the display device 310 performs 2D display without driving the liquid crystal lens.

An example in the case of displaying in a landscape form illustrated in FIG. 10A will be described. That is, the display panel 311 is placed with the second direction y set as a vertical direction. In the state depicted in FIG. 10A, since the display device 310 does not drive the liquid crystal lens, light emitted from each pixel is not essentially separated. As illustrated in FIG. 7, etc., however, the light blocking members 313 extending along the second direction y function as a parallax barrier to cause the light beam separation action to work along the first direction. The brightness and chromaticity of the collection of sub pixels of 1×4 arrayed in each of the columns H1, H2, H3 and H4 arranged along the first direction x are perceived by the integrated value of the sub pixels positioned at V1, V2, V3 and V4. In the case of considering the collection of the four sub pixels arranged in the column H1 in the vertical direction in the drawing, the brightness and chromaticity of the collection of the sub pixels are perceived by the integrated value of the sub pixels R, B, W and G respectively positioned at V1, V2 V3 and V4. Here, since the light blocking member 313 also has a part extending along the first direction x, the sub pixels of V1 and V4 positioned at the upper and lower ends in the drawing for each pixel are partly covered. Accordingly, in the case of white display on the display device 310, for example, the integrated value along the second direction y concerning the brightness and chromaticity of emitted light in the pixel does not take a value corresponding to white and varies along the first direction x column by column.

In the example described above, since the sub pixels of R and G respectively concerning V1 and V4 in the column H1 are partially covered by a part of the light blocking member 313 extending along the first direction x, for the collection of the sub pixels of 1×4, R and G are low in brightness while B and W are relatively high in brightness as compared with R and G. Similarly, since the sub pixels of G and B respectively concerning V1 and V4 in the column H2 are partially covered, for the collection of the sub pixels of 1×4, G and B are low in brightness while W and R are relatively high in brightness as compared with G and B. Since the sub pixels of B and W respectively concerning V1 and V4 in the column H3 are partially covered, for the collection of the sub pixels of 1×4, B and W are low in brightness while R and G are relatively high in brightness as compared with B and W. Since the sub pixels of W and R respectively concerning V1 and V4 in the column H4 are partially covered, for the collection of the sub pixels of 1×4, W and R are low in brightness while G and B are relatively high in brightness as compared with W and R. Thus, color balance varies column by column, and thus, in the case where the light blocking members 313 are provided along both of the first direction x and the second direction y, unevenness of display color, that is, color moire may occur. That is, white display on the display device 310 may be visible for the observer as colored display.

In the above description, the brightness and chromaticity for each column along the first direction x in the pixel are considered while a similar phenomenon occurs to the brightness and chromaticity for each row along the second direction y, which may cause color moire. The description will be made with reference to the portrait form depicted in FIG. 10B. The display panel 311 is placed with the first direction x set as a vertical direction. Similarly to the landscape display, the light blocking members 313 extending along the first direction x function as a parallax barrier. Thus, a light beam separation action works along the second direction y, though too small for the observer to stereoscopically perceive the planar image. The brightness and chromaticity of the collection of the sub pixels of 1×4 arrayed in each of the columns V1, V2, V3 and V4 along the second direction y are perceived by the integrated value of the sub pixels positioned at H1, H2, H3 and H4. In the case of considering the collection of the four sub pixels arranged in the column V1 in the horizontal direction in the drawing, the brightness and chromaticity of the collection of the sub pixels are perceived by the integrated value of the sub pixels R, G, B and W respectively positioned at H1, H2 H3 and H4. Here, since the light blocking member 313 also has a part extending along the second direction y, the sub pixels of H1 and H4 positioned at the upper and lower ends in the drawing for each pixel are partly covered. In the example described above, since the sub pixels of R and W respectively concerning H1 and H4 are partially covered, for the collection of the sub pixels of 1×4, R and W are low in brightness while G and B are high in brightness as compared with R and W. Thus, color balance varies column by column, and thus, in the case where the light blocking member 313 is provided along both of the first direction x and the second direction y, unevenness of display color, that is, color moire may occur.

As has been described above, regardless of the form of display, whether it is in a landscape form or a portrait form, provision of the light blocking members 313 may cause color moire and so on. In the case where the light blocking members 313 are provided so as to be compatible with both of the landscape form and the portrait form, this may cause color moire and so on. In the embodiment below, in order to solve these problems, a display device having a light blocking unit that stops forming of light blocking areas at the time of 2D display is described. Further described is a display device obtained by adding to the above-described display device a function of displaying in the landscape form and in the portrait form and a function of capable of switching the extending direction of the light blocking area.

Embodiment 1

The display device 10 according to the present embodiment will be described below. The display device 10 according to the present embodiment is provided with a light blocking unit 13 (see FIG. 14) for forming a light blocking area 136 in stripes (see the first light-blocking area 136a in FIG. 16A and the second light blocking area 136b in FIG. 16B) that partially blocks the light emitted from the display panel 11, and dynamically switches the extending direction of the light blocking area 136 between the first direction x and the second direction y depending on the switching of the display orientation of an image. This switching prevents color moire from occurring.

Figure 11A:
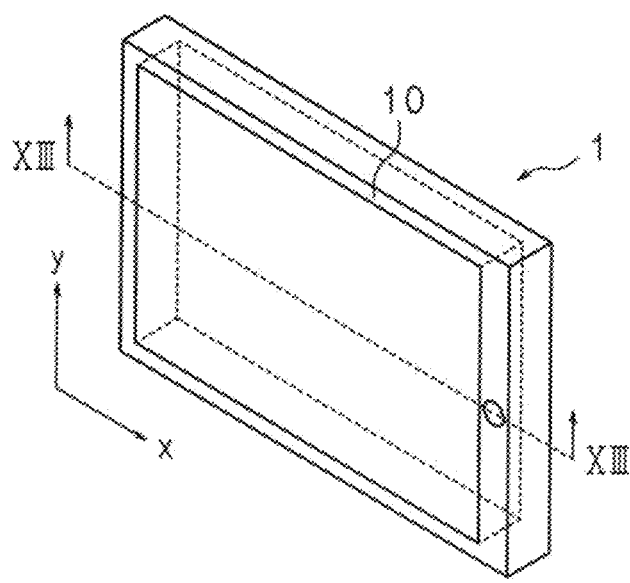
FIG. 11A and FIG. 11B are perspective views of an electronic apparatus with a display device.
Figure 11B:
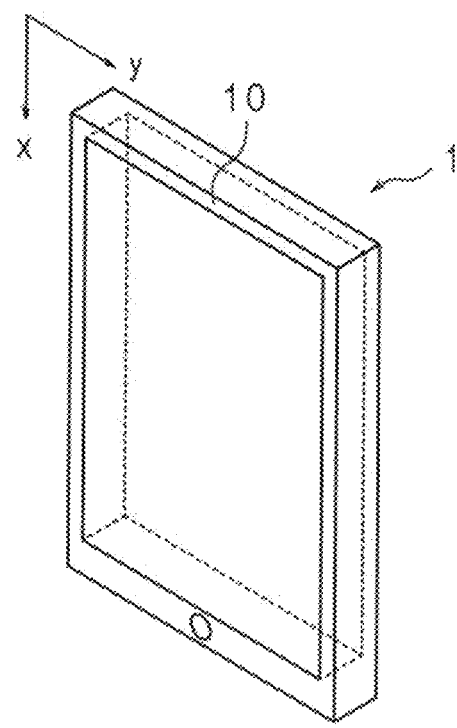

FIG. 11A and FIG. 11B is a perspective view of an electronic apparatus 1 with the display device 10. FIG. 11A depicts a state where the electronic apparatus 1 is placed in the horizontal posture while FIG. 11B depicts a state where the electronic apparatus 1 is placed in the vertical posture. The electronic apparatus 1 is an electronic apparatus such as a smartphone similarly to the electronic apparatus 301 according to the related art. The display device 10 is a display device such as a liquid crystal display mounted on the electronic apparatus 1 and performs 3D display and 2D display. Furthermore, the display device 10 switches between landscape display and portrait display as respectively illustrated in FIG. 11A and FIG. 11B depending on the placed state of the electronic apparatus 1. That is, the display device 10 performs landscape display in a state placed in a horizontal posture depicted in FIG. 11A and performs portrait display in a state placed in the vertical posture depicted in FIG. 11B.

Figure 12:
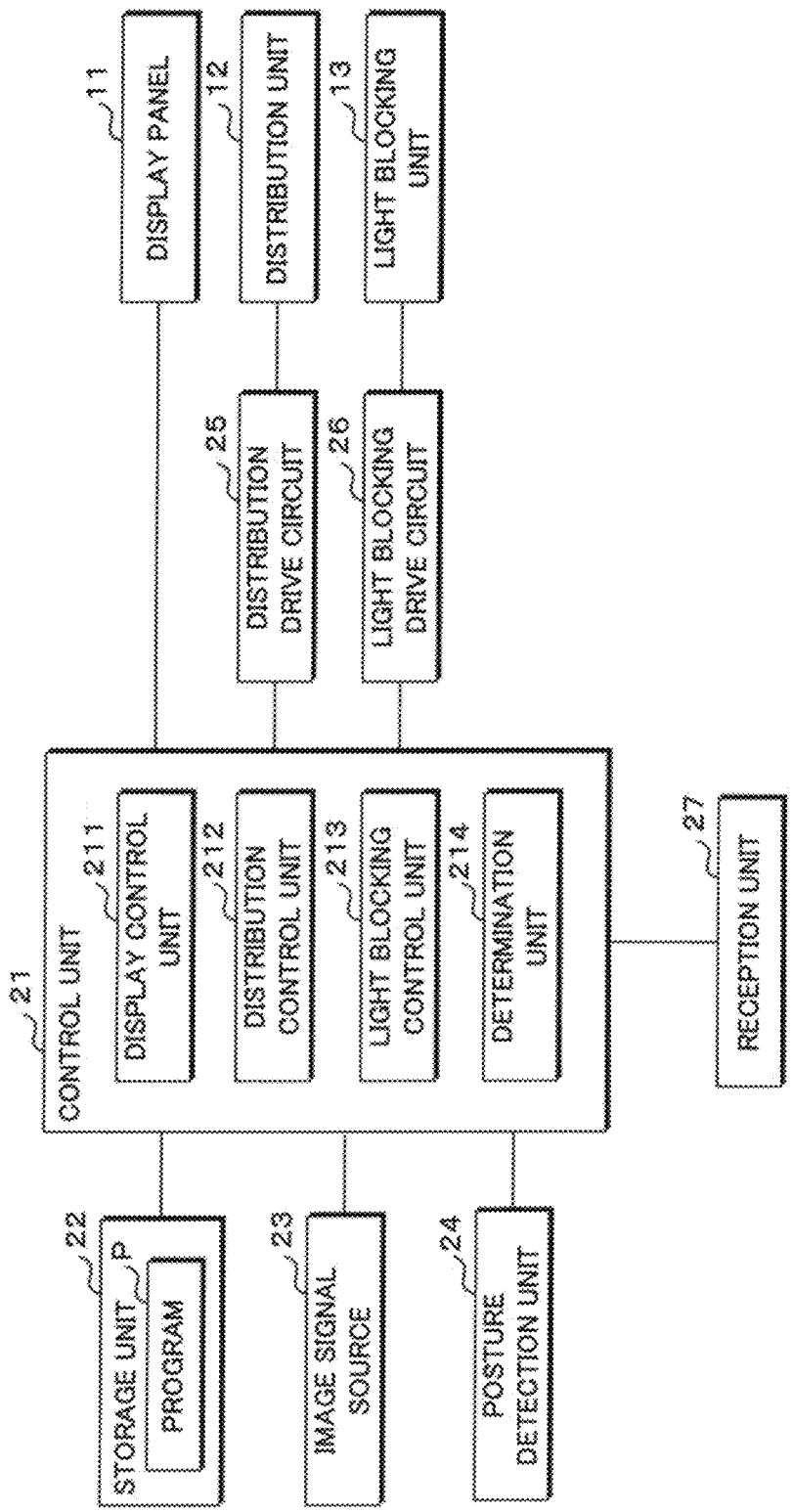
FIG. 12 is a block diagram illustrating an example of the configuration of the display device.

FIG. 12 is a block diagram illustrating an example of the configuration of the display device 10. The display device 10 is a 3D display device mounted on the electronic apparatus 1 and is, for example, a liquid crystal display device. The display device 10 includes a control unit 21, a storage unit 22, an image signal source 23, a posture detection unit 24, a distribution drive circuit 25, a light blocking drive circuit 26, a reception unit 27, a display panel 11, a distribution unit 12, and light blocking unit 13.

The control unit 21 includes an arithmetic processor such as a central processing unit (CPU) and a micro-processing unit (MPU) and is a display controller for controlling image display processing concerning the display device 10. The storage unit 22 includes memory elements such as random access memory (RAM) and read only memory (ROM) and stores a program or data required for executing processing by the control unit 21. The storage unit 22 temporarily stores data or the like required for executing processing by the control unit 21. The image signal source 23 includes an image processing circuit (not illustrated) and generates an image signal for causing the control unit 21 to display an image on the display panel 11 and applies it to the control unit 21. The image signal source 23 is connected to a communication antenna (not illustrated) contained in the electronic apparatus 1, for example, and processes an image signal input from the outside and applies the resultant to the control unit 21.

The distribution drive circuit 25 is a drive circuit for driving the distribution unit 12 in response to the instruction from the control unit 21. In the case where the distribution unit 12 is a liquid crystal lens, the distribution drive circuit 25 applies alternate current (AC) voltage to driving electrodes of the liquid crystal lens to form a lenticular-lens-like refractive index profile.

The light blocking drive circuit 26 is a drive circuit for driving the light blocking unit 13 and drives the light blocking unit 13, which will be described later, according to an instruction from the control unit 21.

The posture detection unit 24 detects the posture of the display device 10. The posture detection unit 24 is, for example, a gyro sensor for detecting the tilt of the display panel 11 and applies a detected value to the control unit 21.

The reception unit 27 is an input interface such as a touch panel and a press button for receiving an operation input from the observer. The reception unit 27 applies the received content of the operation to the control unit 21.

By reading out a program P and executing it, the control unit 21 functions as follows. A determination unit 214 determines whether the display device 10 is placed in the horizontal posture or the vertical posture based on the result of detection of the posture of the display device 10 by the posture detection unit 24. A display control unit 211 performs processing of switching the display state of the display panel 11 between a first display state to display a parallax image (3D display) and a second display state to display a planar image (2D display). Furthermore, the display control unit 211 acquires a determination result from the determination unit 214 and displays a planar image or a parallax image on the display panel 11 in either landscape form or a portrait form according to the determination result. In the case of 3D display, a distribution control unit 212 controls the distribution drive circuit 25 according to the determination result by the determination unit 214 and switches the state of the distribution unit 12 between the first distribution state and the second distribution state. In the case of 3D display on the display control unit 211, a light blocking control unit 213 controls the light blocking drive circuit 26 according to the determination result by the determination unit 214 to cause the light blocking unit 13 to form the light blocking area 136 described below in accordance with the state of the distribution unit 12. Note that the control unit 21 may have a circuit configuration.

Figure 13:
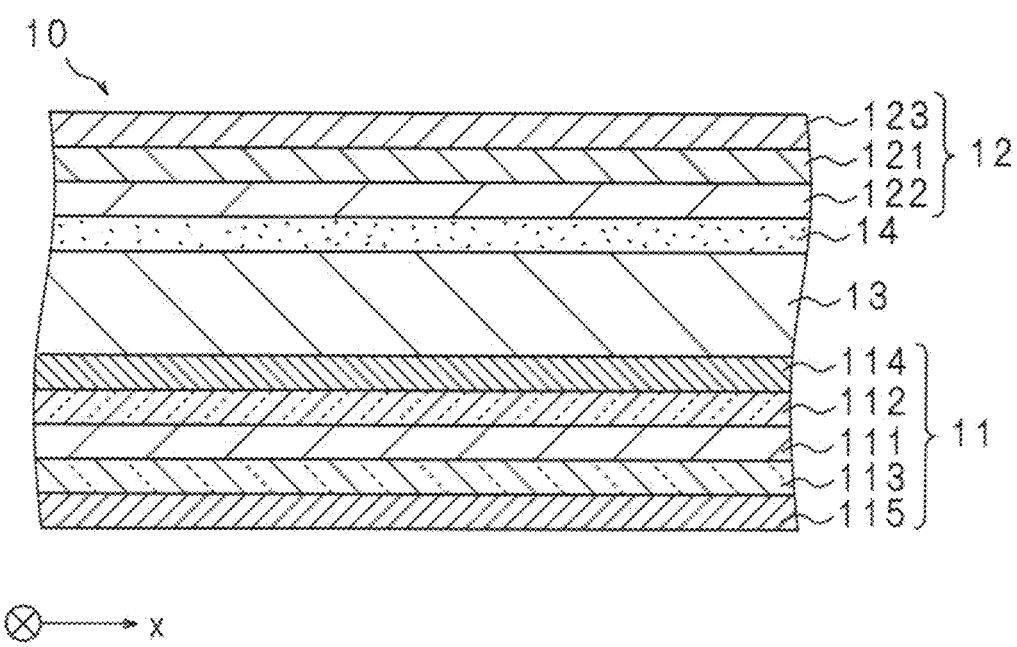
FIG. 13 is a partial cross-sectional view illustrating an example of the configuration of the display device.

FIG. 13 is a partial cross-sectional view illustrating an example of the configuration of the display device 10. Note that FIG. 13 illustrates a cross-sectional view of the display device 10 taken from line XIII-XIII of FIG. 11A. The display device 10 according to the present embodiment includes the display panel 11, the distribution unit 12 and the light blocking unit 13.

The display panel 11 is a liquid crystal panel and includes two sheets of transparent substrates 112 and 113 facing each other with clearance, a liquid crystal layer 111 sealed between the facing surfaces of the transparent substrates 112 and 113, and polarizers 114 and 115 that are respectively laminated on the front side of the transparent substrate 112 and on the backside of the transparent substrate 113. By causing liquid crystal molecules in the liquid crystal layer 111 to align according to a display image and causing light emitted from a back light source (not illustrated) placed at the back side to transmit toward the front side, an image is displayed.

The display panel 11 is, for example, a twisted nematic (TN) liquid crystal panel, and the axes of transmission of the polarizers 114 and 115 are perpendicular to each other.

The distribution unit 12 is an electrical optics capable of switching a light beam separation direction and is a liquid crystal lens, for example. As illustrated in FIG. 13, the distribution unit 12 includes two sheets of transparent substrates 122 and 123 that face each other and a liquid crystal layer 121 sealed between the transparent substrates 122 and 123. Driving electrodes (not illustrated) are arranged on the facing surfaces of the transparent substrates 122 and 123, and by application of voltage from an external voltage source to the driving electrodes, the liquid crystal molecules in the liquid crystal layer 121 are aligned. This allows the distribution unit 12 to form a lenticular-lens-like refractive index profile regarding the second direction y or the first direction x as an extending direction and distributes the light emitted from the display panel 11 along the first direction x or the second direction y.

The light blocking unit 13 is disposed between the display panel 11 and the distribution unit 12. The light blocking unit 13 is an optical element for blocking part of the light emitted from the display panel 11 in the case of performing 3D display, and is a liquid crystal barrier, for example. Description will be made below regarding the light blocking unit 13 as a liquid crystal barrier. Note that a polarizer 14 is interposed between the distribution unit 12 and the light blocking unit 13, and axes of transmission of the polarizer 14 and the polarizer 114 are perpendicular to each other.

Figure 14:
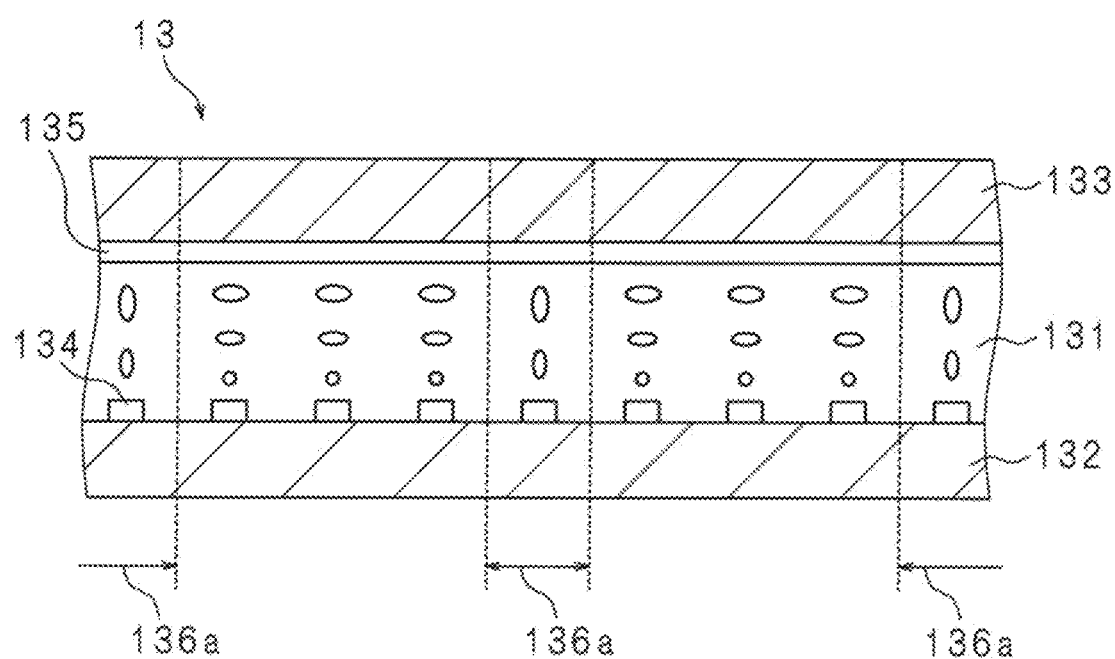
FIG. 14 is a partial cross-sectional view illustrating an example of the configuration of a light blocking unit.

FIG. 14 is a partial cross-sectional view illustrating an example of the configuration of the light blocking unit 13. FIG. 15 depicts an example of the arranged configuration of electrodes 134 and 135. Similarly to FIG. 13, FIG. 14 depicts a cross-sectional view perpendicular to the second direction y. The light blocking unit 13 includes two sheets of transparent substrates 132 and 133, a liquid crystal layer 131 and the electrodes 134 and 135. The transparent substrates 132 and 133 face each other with clearance. The liquid crystal layer 131 is sealed between the facing surfaces of the transparent substrates 132 and 133. Furthermore, the electrodes 134 and 135 are respectively arranged on the facing surfaces of the transparent substrates 132 and 133. Multiple electrodes 134 each extending along the second direction y throughout the length of the short side of the display panel 11 are arranged in stripes along the first direction x. Multiple electrodes 135 each extending along the first direction x throughout the length of the long side of the display panel 11 are arranged in stripes along the second direction y. As illustrated in FIG. 15, the electrodes 134 and 135 are orthogonal to each other in front view.

By applying voltage to the electrodes 134 and 135, a part of the liquid crystal molecules in the liquid crystal layer 131 are aligned to partially block the light incident from the display panel 11 to the light blocking unit 13. For example, consider a case where 3D display is performed in the landscape form. In this case, voltage is applied to the electrodes 134. More specifically, voltage is selectively applied to a part of the multiple electrodes 134 arrayed along the first direction x. In FIG. 14, for example, voltage is selectively applied to the electrodes 134 positioned at the areas indicated by the reference code 136a (light blocking area 136 described later). Note that the electrode 134 and the electrode 135 to which no voltage is applied are regarded as 0 V. In the case where voltage is applied to the electrode 134, the liquid crystal molecules in the liquid crystal layer 131 near the electrode 134 to which voltage is applied are oriented in the vertical direction. The light incident from the display panel 11 to the liquid crystal layer 121 through the transparent substrate 132 is emitted toward the front side through the transparent substrate 132 as it is at the part where the liquid crystal molecules are oriented forward without changing the polarized state. In this case, the axes of transmission of the polarizer 14 positioned in front of the light blocking unit 13 and the polarizer 114 positioned at the back thereof are perpendicular to each other, which causes the polarizer 14 to block the light transmitted through the light blocking unit 13. That is, by applying voltage to the electrodes 134, the light blocking unit 13 forms the first light blocking areas 136a depicted in FIG. 14 to thereby block part of the light emitted from the display panel 11. By selectively applying voltage to the multiple electrodes 134, the multiple first light blocking areas 136a are formed to be arrayed along the first direction x as illustrated in FIG. 14. The electrodes 134 extend along the second direction y, and thus the first light blocking area 136a extends along the second direction y. Hence, the multiple first light blocking areas 136a are formed in stripes at the light blocking unit 13 as a whole.

In the case of 3D display in the portrait form, voltage is applied, not to the electrode 134 on the back side but to the electrode 135 on the front side. Note that the electrode 135 and the electrode 134 to which no voltage is applied are regarded as 0 V. This allows second light blocking areas 136b extending along the first direction x to be formed on the liquid crystal layer 131 (see FIG. 16B). Hence, by selecting either the electrode 134 or the electrode 135 to be applied with voltage, the display device 10 allows the first light blocking areas 136a and the second light blocking areas 136b to be formed. For the sake of convenience, either or both of the first light blocking area 136a and the second light blocking area 136b are represented as the light blocking area 136.

Figures 16A, 16B:
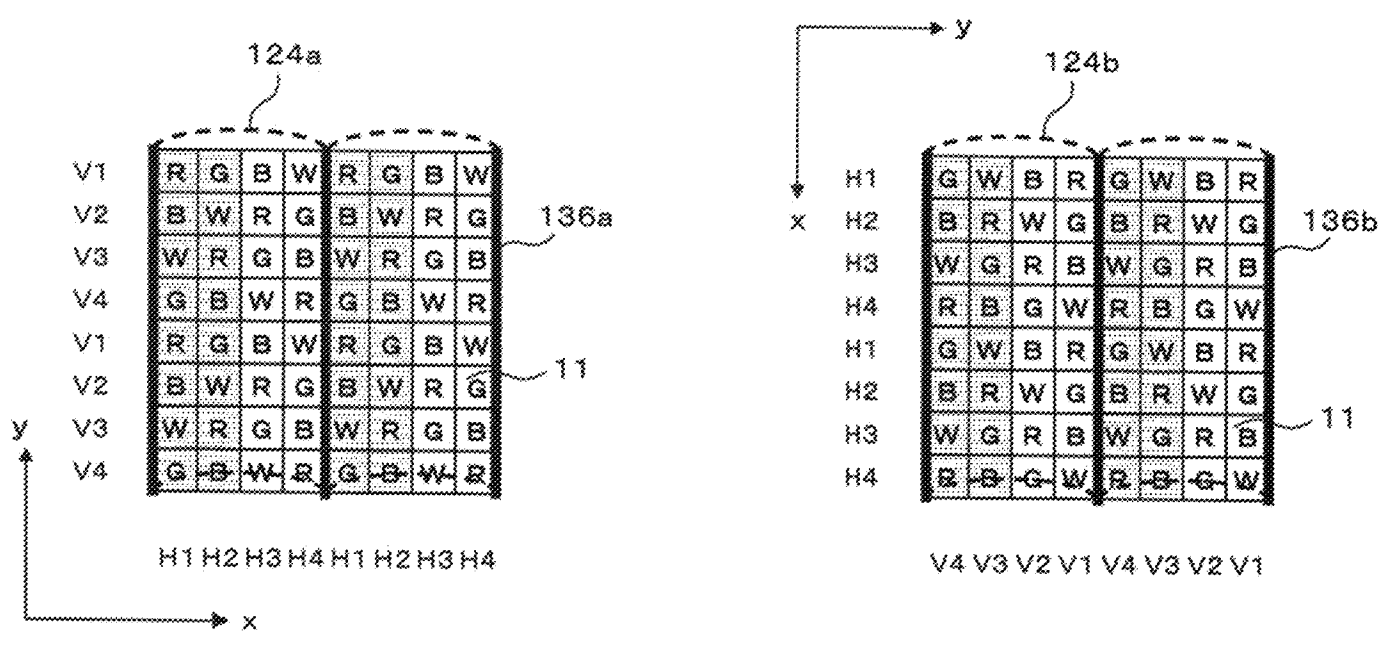
Figure 17A:
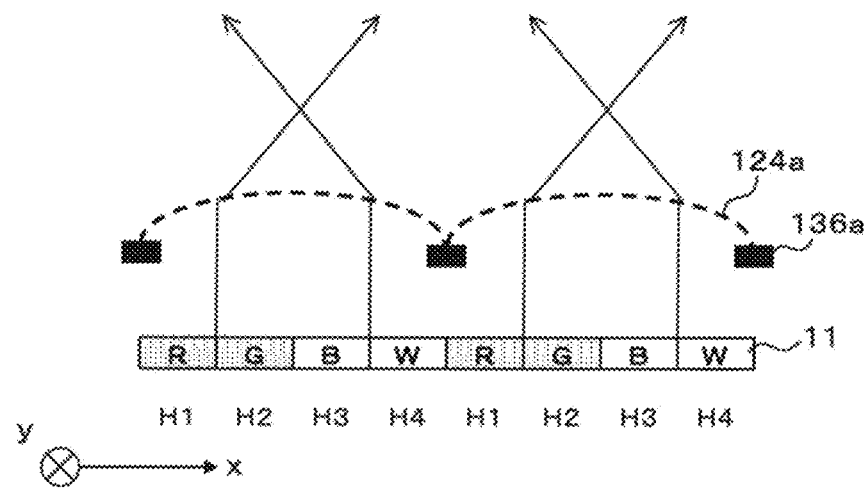
FIG. 17A and FIG. 17B simply depict 3D display.
Figure 17B:
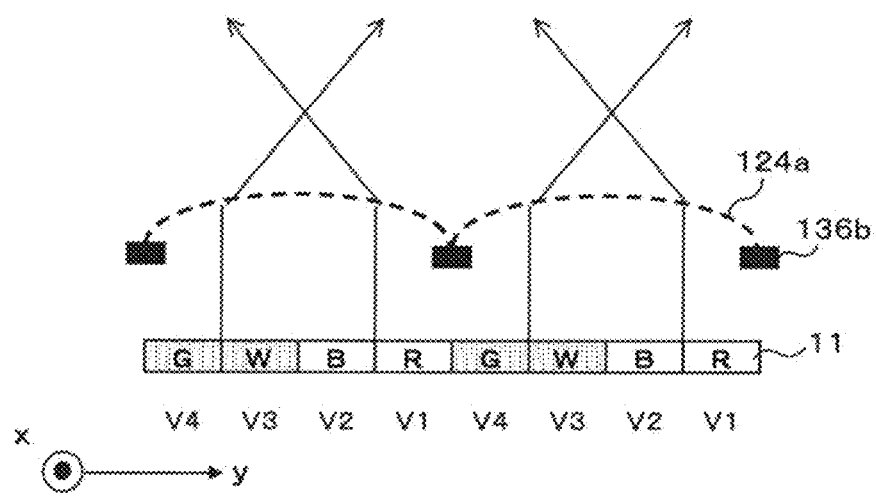
Figure 19A:
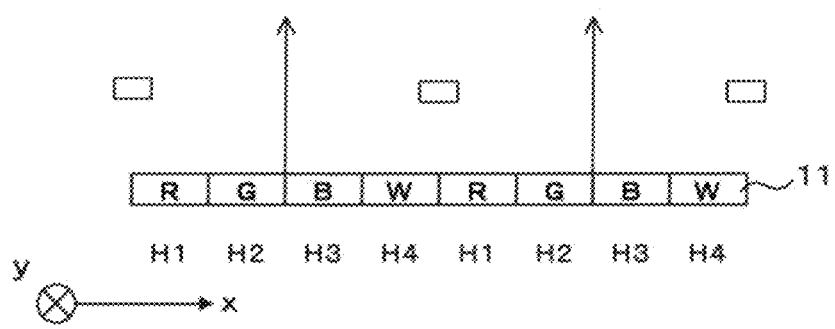
FIG. 19A and FIG. 19B simply depict 2D display.
Figure 19B:
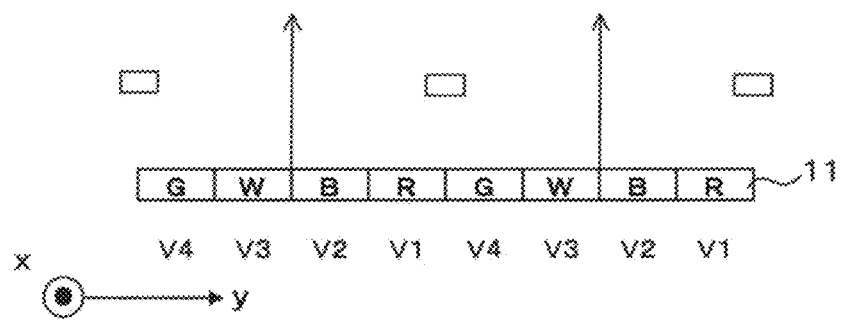
Figure 21A:
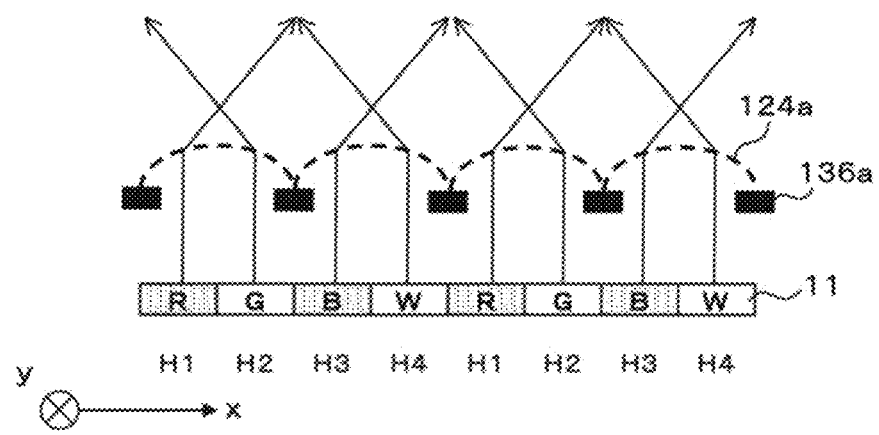
FIG. 21A and FIG. 21B are illustrative views of other examples of array patterns of pixels.
Figure 21B:
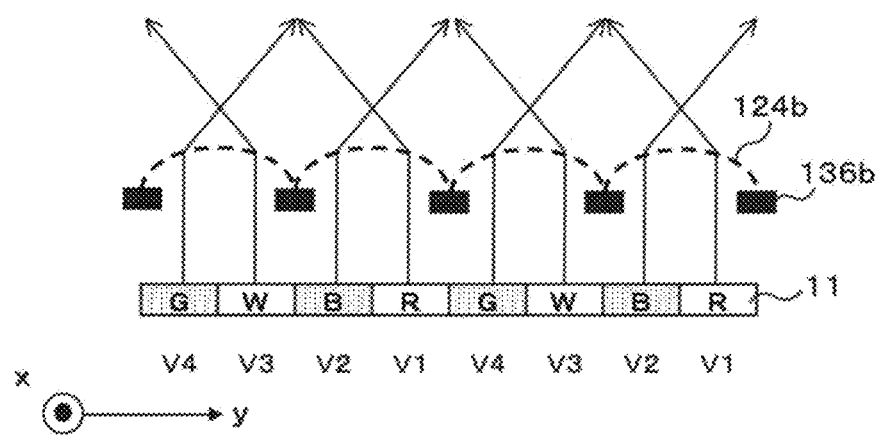

FIG. 16A to FIG. 17B simply depict 3D display according to the present embodiment. FIG. 16A to FIG. 17B conceptually illustrate a case where the display panel 11 displays four primary colors regarding sub pixels of 4×4 as a pixel unit. In the case of the landscape form, for example, the display panel 11 alternately displays each parallax image corresponding to two columns of sub pixels along the first direction x as illustrated in FIG. 16A and FIG. 17A. Furthermore, the distribution unit 12 forms a first separation area 124a with a forming width corresponding to four columns of sub pixels along the first direction x and distributes emitted light concerning each parallax image to each viewpoint. In the case of performing 3D display in the portrait form, the display panel 11 alternately displays each parallax image at a pitch corresponding to two columns of sub pixels along the second direction y as illustrated in FIG. 16B and FIG. 17B. Furthermore, the distribution unit 12 forms a second separation area 124b with a forming width corresponding to four columns of sub pixels along the second direction y.

Meanwhile, the light blocking unit 13 forms multiple light blocking areas 136 extending along the first direction x or the second direction y. In the case of the landscape form, for example, the light blocking unit 13 forms the multiple first light blocking areas 136a extending along the second direction y each of which is arrayed at a pitch corresponding to four columns of sub pixels along the first direction x such that the light emitted from the display panel 11 is blocked at each boundary portion between the separation areas 124 as illustrated in FIG. 16A. The light blocking unit 13 forms the first light blocking areas 136a extending along the second direction y at the positions facing the boundary portions between the first separation areas 124a. Thus, the boundary portions between the separation areas 124 are covered while the light blocking area 136 extending along the first direction x is not formed. That is, the sub pixels positioned at the upper and lower ends for each pixel in the drawing are not partially covered. Accordingly, in the case of white display, for example, the integrated value concerning the brightness and chromaticity of the light emitted from the sub pixels of V1, V2, V3 and V4 arrayed in each of the columns H1 to H4 represents substantially the same chromaticity, that is, white for each of the columns H1 to H4. That is, the integral along the second direction y concerning the brightness and chromaticity of light emitted in a pixel represents substantially the same chromaticity, i.e., white for each column arranged along the first direction x. This makes it possible to effectively prevent color moire from occurring.

In the case of 3D display in the portrait form, the light blocking unit 13 switches the extending direction of the light blocking area 136 to the first direction x as illustrated in FIG. 16B and FIG. 17B. More specifically, the light blocking unit 13 forms the multiple second light blocking areas 136b extending along the first direction x each of which is arrayed at a pitch corresponding to four columns of sub pixels along the second direction y. Thus, the extending direction of the light blocking area 136 can also be switched in accordance with the switching of the display orientation of an image, which makes it possible to suitably block the light emitted from display panel 11 and incident to the boundary potion of the separation area 124.

Meanwhile, in the case of performing 2D display, the display device 10 stops the operation of the distribution unit 12 and the light blocking unit 13 to thereby display a planar image on the display panel 11. More specifically, as illustrated in FIG. 18A to FIG. 19B, only switching of the display orientation of an image between a landscape form and a portrait form is performed on the display panel 11, and the distribution unit 12 and the light blocking unit 13 does not respectively form the separation area 124 and the light blocking area 136. This causes the distribution unit 12 and the light blocking unit 13 to transmit the light emitted from the display panel 11 toward the front side as it is. Hence, the display device 10 may stop distributing the emitted light by the distribution unit 12 and stop forming the light blocking area 136, in the 2D display (second display state), whereby the problems of color moire, 3D moire and so on as illustrated in FIG. 5 may be avoided.

As described above, the display device 10 switches the extending direction of the separation area 124 and the light blocking area 136 in accordance with the switching of the display orientation of an image at the time of 3D display as well as stops forming the separation area 124 and the light blocking area 136 at the time of 2D display. This makes it possible to prevent color moire or the like from occurring.

Next, other examples of display patterns of the parallax images are described using FIG. 20A to 21B. FIG. 20A to FIG. 21B illustrate examples of display patterns of the parallax images different from those depicted in FIG. 16A to FIG. 17B. In FIGS. 20A and 20B, each of the parallax images is alternately displayed at a pitch corresponding to not two columns of sub pixels but one column of a sub pixel. In this case, the distribution unit 12 forms each separation area 124 at a forming width corresponding to two columns of sub pixels. The display device 10 is provided with the light blocking unit 13 in place of the light blocking member 313, and the light blocking unit 13 forms each light blocking area 136 at a pitch corresponding to two columns of sub pixels. The light blocking area 136 extends in either the second direction y or the first direction x depending on the placed state of the display device 10, which makes it possible to suitably block the light emitted from the display panel 11 only at the boundary portions between the separation areas 124.

As described above, even if the display patterns of the respective parallax images of the sub pixels are changed from the display patterns illustrated in FIG. 16A to 17B, the distribution unit 12 may distribute emitted light concerning each of the parallax images to each of the viewpoints. Furthermore, the light blocking unit 13 may prevent light scatter at the boundary portions between the separation areas 124 from occurring and suppress the occurrence of color moire and so on.

FIG. 22A and FIG. 22B are illustrative views of examples of array patterns of sub pixels concerning the three primary colors. Though the display panel 11 displays four primary colors of RGBW in the description above, the present embodiment is not limited thereto, but may display three primary colors of RGB, for example. In this case, sub pixels of RGB are arrayed as illustrated in FIG. 22A, for example. More specifically, each pixel consists of sub pixels of 2×6. Assuming that sub pixels of two columns consisting of adjacent odd and even columns, i.e., columns H1 and H2 are regarded as one unit, each pixel is arrayed along the first direction x for each unit (that is, by the units of every two columns). In examples in FIG. 22A and FIG. 22B, adjacent sub pixels arranged along the first direction x and the second direction y are subjected to color compensation so as to have different primary colors similarly to the case of the four primary color.

The display panel 11 displays each parallax image at a pitch corresponding to one column of a sub pixel, for example. The distribution unit 12 forms each separation area 124 at a forming width corresponding to two columns of sub pixels. The light blocking unit 13 forms each light blocking area 136 at an array pitch corresponding to two columns of sub pixels. Even in the configuration illustrated in FIGS. 22A and 22B, that is, in the case of the three primary colors, an arbitrary color may be displayed in each pixel. As illustrated in FIGS. 16A and 16B, the boundary portion between the separation areas 124 is covered while the light blocking area extending along the first direction x in FIG. 22A and the light blocking area extending along the second direction y in FIG. 22B are not formed. Thus, similarly to the above description, in the case of white display, for example, the integral along the second direction y concerning the brightness and chromaticity of light emitted in a pixel represents substantially the same chromaticity, i.e., white for each column arranged along the first direction x in FIG. 22A. This makes it possible to prevent color moire from occurring. In the case of white display, for example, the integral along the first direction x concerning the brightness and chromaticity of light emitted in a pixel represents substantially the same chromaticity, i.e., white for each column arranged along the second direction y in FIG. 22B. This makes it possible to prevent color moire from occurring.

FIG. 23A and FIG. 23B are illustrative views of other examples of array patterns of sub pixels concerning the three primary colors. Variety of array patterns of pixels may be employed as array patterns of pixels, not limited to the array patterns in the above-described embodiments. FIGS. 23A and 23B illustrate array patterns of sub pixels on which color compensation is not performed such that adjacent sub pixels have different primary colors unlike FIG. 22A and FIG. 22B, for example. More specifically, sub pixels of the same primary color are configured to be aligned along the second direction y. In FIG. 23A, one 3D pixel consists of sub pixels of 2×1, for example. That is, V1 (or V2) in the columns H1 and H2, V1 (V2) in the columns H3 and H4, or V1 (V2) in the columns H5 and H6 are regarded as one 3D pixel. In FIG. 23B, one pixel consists of sub pixels of 2×3. That is, H1, H2 and H3 (or H4, H5 and H6) in the V1 and V2 columns are regarded as one pixel. In the case of FIG. 23A, one 3D pixel may not display an arbitrary color while multiple 3D pixels together may display an arbitrary color when subjected to image processing. Furthermore, as illustrated in FIG. 16A and FIG. 16B, the boundary portion between the separation areas 124 is covered while the light blocking area 136 extending along the second direction y is not formed in FIG. 23B. Hence, in the case of white display, for example, the integral along the first direction x concerning the brightness and chromaticity of light emitted in a pixel represents substantially the same chromaticity, i.e., white for each column arranged along the second direction y similarly to the above description. This makes it possible to prevent color moire and so on from occurring.

Figure 24:
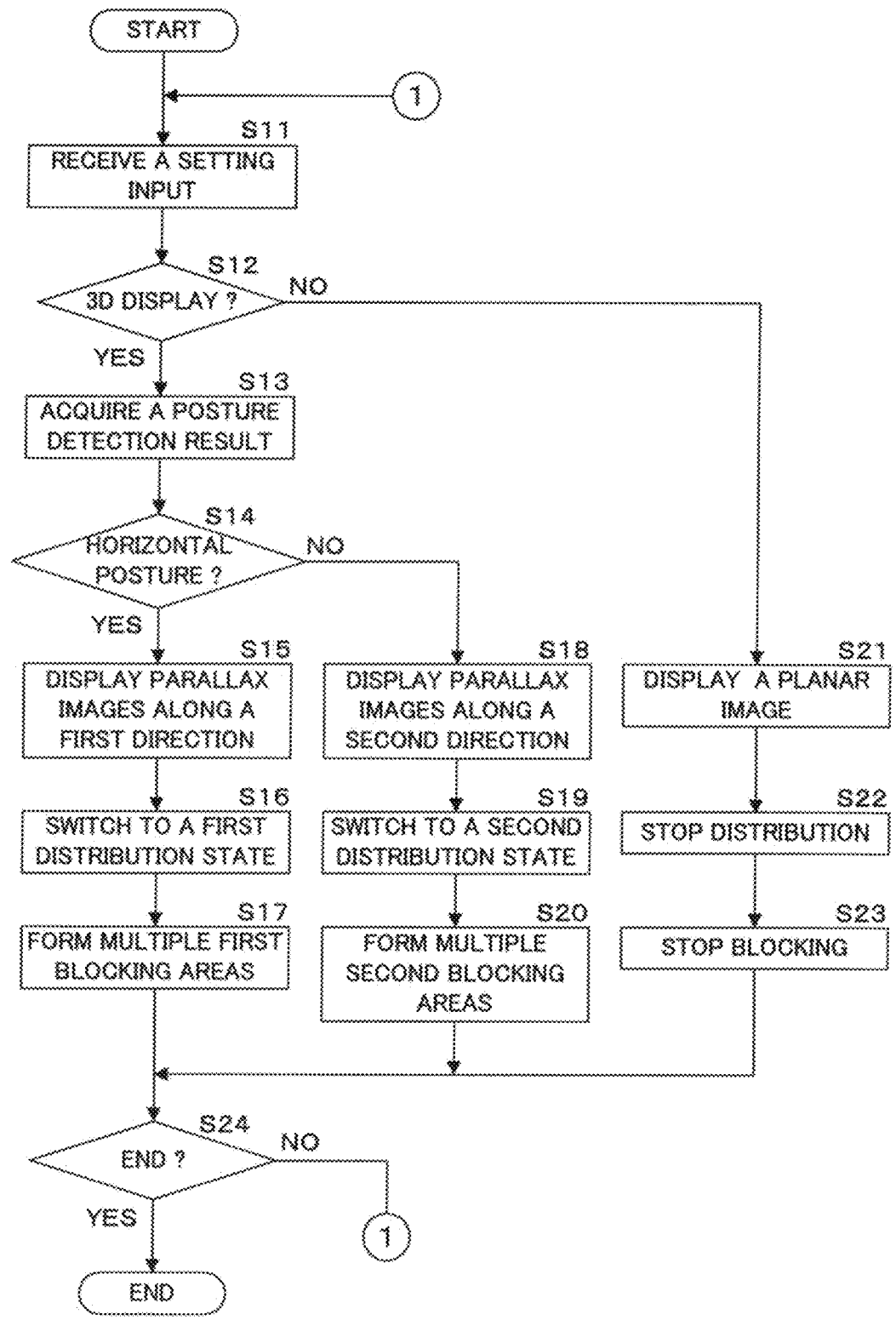
FIG. 24 is a flowchart depicting an example of a processing procedure to be executed by a control unit.

FIG. 24 is a flowchart illustrating an example of a processing procedure to be executed by the control unit 21. The content of the image processing to be executed by the control unit 21 will be described based on FIG. 24.

The control unit 21 receives via the reception unit 27 a setting input as to whether a first display state to display parallax images or a second display state to display a planar image is employed (step S11). That is, the control unit 21 receives a setting input as to whether 3D display or 2D display is to be performed. The control unit 21 determines whether or not 3D display is to be performed based on the setting input received at step S11 (step S12). If it is determined that 3D display is performed (S12: YES), the control unit 21 acquires a detection result acquired by detecting the posture of its own apparatus from the posture detection unit 24 (step S13). More specifically, the control unit 21 acquires a detected value concerning the tilt of the display panel 11. The control unit 21 determines whether or not the apparatus is placed in the horizontal posture based on the detection result acquired at step S13 (step S14).

If it is determined the horizontal posture is possible (S14: YES), the control unit 21 sets the display state of the display panel 11 to the first display state and alternately displays parallax images for each viewpoints corresponding to multi viewpoints along the first direction x (step S15). In other words, the control unit 21 displays parallax images in the landscape form.

The control unit 21 further switches the state of the distribution unit 12 to a first distribution state for distributing light emitted from each pixel to multi viewpoints along the first direction x (step S16). More specifically, the control unit 21 controls the distribution drive circuit 25 to drive the distribution unit 12 and causes multiple first separation areas 124a extending along the second direction y to be formed in an array along the first direction x. This causes liquid crystal molecules in the liquid crystal layer 121 to align to thereby form a lenticular-lens-like refractive index profile in which multiple cylindrical lenses extending along the second direction y are arranged along the first direction x.

The control unit 21 further causes the light blocking unit 13 to form, along the first direction x, multiple first light blocking areas 136a extending along the second direction y that block part of the light emitted from each pixel (step S17). More specifically, the control unit 21 controls the light blocking drive circuit 26 to selectively apply voltage to a part of the electrodes 134 positioned at the boundary portions between the respective separation areas 124 of the distribution unit 12 out of the multiple electrodes 134 arranged in stripes. Thus, a part of the liquid crystal molecules in the liquid crystal layer 131 align so as to be arrayed at a pitch substantially the same as the forming width of each separation area 124 of the distribution unit 12, which forms multiple first light blocking areas 136 covering the boundary portions between the respective separation areas 124. The control unit 21 shifts the processing to step S24.

If it is determined the horizontal postured is not possible (S14: NO), the control unit 21 sets the display state of the display panel 11 to the first display state and alternately displays each of the parallax images along the second direction y (step S18). In other words, the control unit 21 displays a parallax image in the portrait form. The control unit 21 switches the distribution unit 12 to a second distribution state for distributing emitted light to multi viewpoints along the second direction y (step S19). More specifically, the control unit 21 causes the distribution unit 12 to form multiple second separation areas 124b extending along the first direction x. The control unit 21 causes the light blocking unit 13 to form, along the second direction y, multiple second light blocking areas 136b extending along the first direction x that block part of the light emitted from each pixel (step S20). The control unit 21 shifts the processing to the step S24.

If it is determined that 3D display is not performed (S12: NO), the control unit 21 sets the display state of the display panel 11 to the second display state to thereby display a planar image for 2D display on the display panel 11 (step S21). The control unit 21 stops forming the separation areas 124 by the distribution unit 12 (step S22). The control unit 21 stops forming the light blocking areas 136 by the light blocking unit 13 (step S23).

After execution of the processing in the step S17, S20 or S23, the control unit 21 determines whether or not image display processing is to be ended (step S24). For example, the control unit 21 determines whether or not an operation input concerning an end instruction is received via the reception unit 27. If it is determined that the processing is not to be ended (S24: NO), the control unit 21 returns the processing to step S11. If it is determined that the processing is to be ended (S24: YES), the control unit 21 ends a series of processing.

Figure 25:
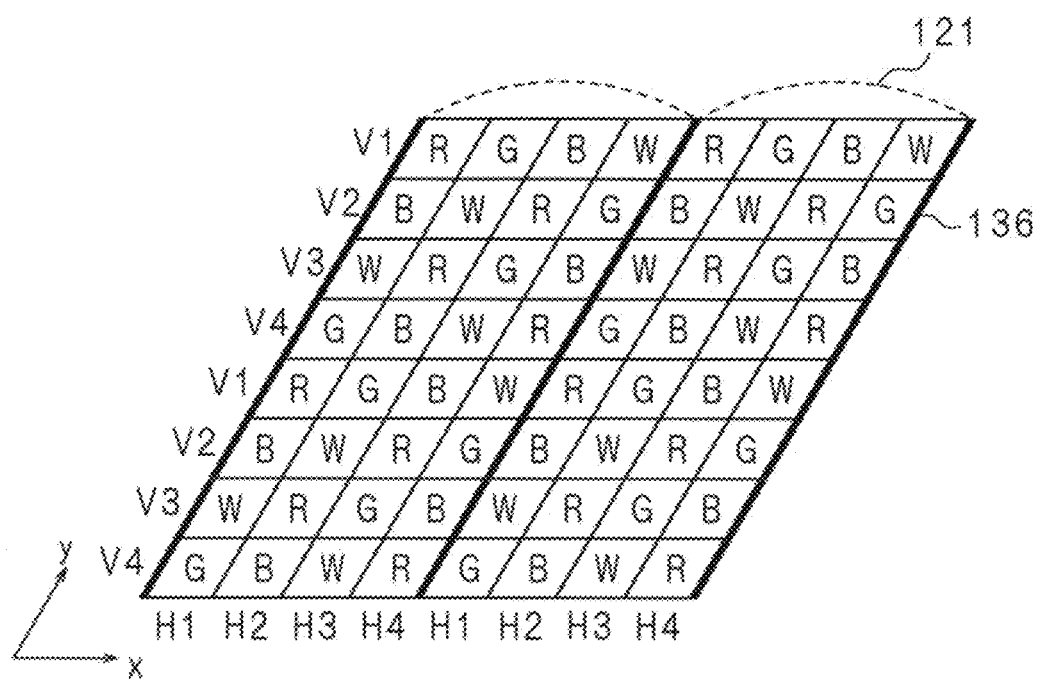
FIG. 25 illustrates another example of the configuration of the display device.

It is noted that description is made taking the case where the first direction x and the second direction y are perpendicular to each other as an example in the above description, though the embodiment is not restricted thereto. FIG. 25 illustrates another example of the configuration of the display device 10. As depicted in FIG. 25 for example, the display panel 11 may be configured to be rhombic, not rectangular. Even in this case, by changing the shape of the separation areas 124 and the light blocking areas 136 in accordance with the arrangement configuration of the respective pixels, 3D display is made possible. That is, the display device 10 according to the present embodiment is applicable even if the first direction x and the second direction y are not perpendicular to each other.

Note that the display device 10 according to Embodiment 1 has a function of being capable of switching between the landscape display and the portrait display as well as a function of being capable of switching the extending direction of the light blocking area 136, but these two functions need not to be provided. If the two functions are not provided, the posture detection unit 24 and the determination unit 214 are not required, and the display control unit 211 does not execute processing for displaying a planar image or a parallax image on the display panel 11 in either the landscape form or the portrait form. Furthermore, the light blocking unit 13 does not execute switching of the extending direction of the light blocking areas 136.

In addition, the display device 10 according to Embodiment 1 has a function of being capable of displaying in the landscape form and the portrait form as well as a function of being capable of switching the extending direction of the light blocking area 136 while it may not have a function of stopping distribution of the emitted light by the distribution unit 12 at the time of 2D display (second display state).

Hence, according to the Embodiment 1, the display device 10 performs distribution of emitted light and formation of the light blocking areas 136 by driving the distribution unit 12 and the light blocking unit 13 respectively at the time of 3D display (first display state) while stopping performing distribution of emitted light and formation of the light blocking areas 136 without driving the distribution unit 12 and the light blocking unit 13 at the time of the 2D display (second display state). This makes it possible to avoid the problems such as color moire, 3D moire and so on described above and acquire better display characteristics.

Moreover, according to Embodiment 1, even if the display device 10 is configured to be switchable between the landscape display and the portrait display, the extending direction of the light blocking areas 136 is switched depending on the display orientation of an image, which enables 3D display appropriately while reducing occurrence of color moire and so on.

In addition, according to Embodiment 1, the light blocking areas 136 are formed at each boundary portion between the respective separation areas 124, which may appropriately prevent the color moire and so on from occurring.

Furthermore, according to Embodiment 1, multiple sub pixels aligned along the first direction x or the second direction y along which the light blocking areas 136 extend are equal in number for each of the different colors within a pixel. Accordingly, in the case of white display, for example, the integrated value in the extending direction of the light blocking area 136 concerning the brightness and chromaticity of light emitted in a pixel is substantially the same chromaticity, i.e., white for each column arranged in the direction perpendicular to the light blocking area 136. By setting colors of each of the sub pixels as described above, occurrence of color moire may be effectively suppressed.

In addition, according to Embodiment 1, unlike FIGS. 23A and 23B, the colors of the adjacent sub pixels are subjected to color compensation so as to have different colors as in FIG. 16A, FIG. 16B, FIG. 20A, FIG. 20B, FIG. 22A and FIG. 22B. By this color compensation, occurrence of color moire may be effectively suppressed on both display in the portrait form and the landscape form.

Embodiment 2

Description is made taking two viewpoints as an example in Embodiment 1, but light blocking control in Embodiment 1 may be applied to viewpoints more than two viewpoints, not limited to two viewpoints. In the present embodiment, description is made on the case where the display device 10 performs image display directed to viewpoints more than two viewpoints. It is noted that the contents overlapped with those in Embodiment 1 will not be described by applying the same reference codes to the drawings.

Figure 26B:
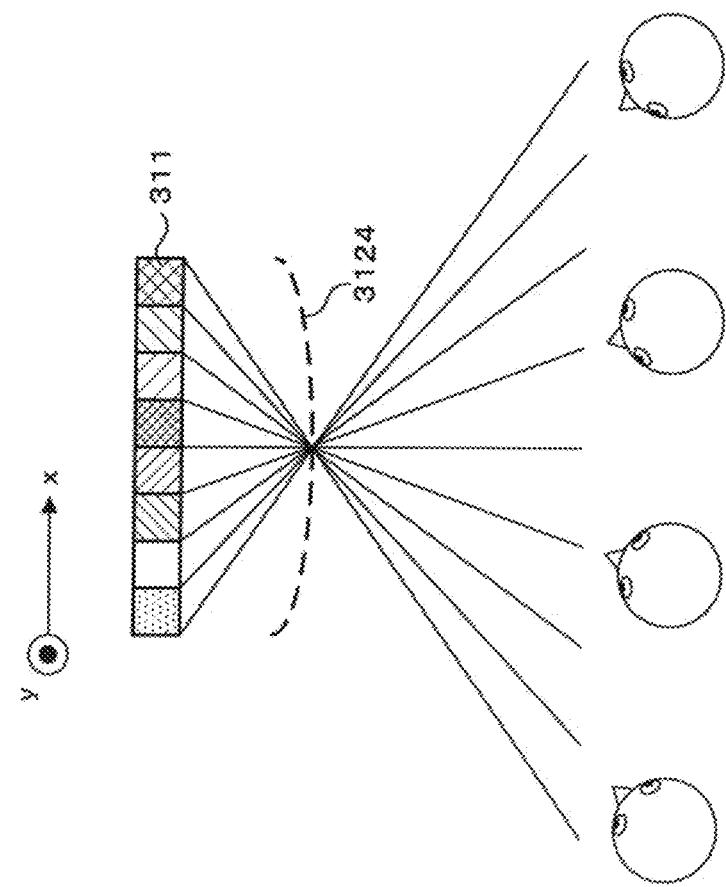
FIG. 26A and FIG. 26B depict image display directed to multi viewpoints.
Figure 26A:
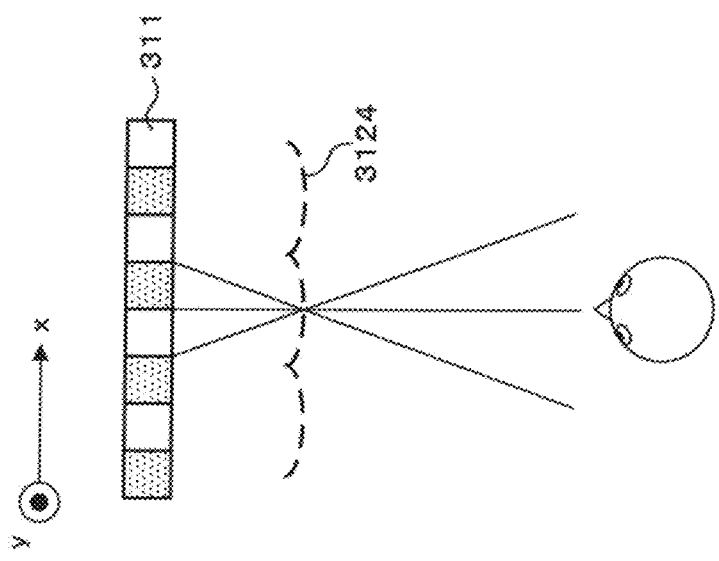

Before describing the present embodiment, a related art concerning image display directed to multi viewpoints and its problem will be described. FIG. 26A and FIG. 26B depict image display directed to multi viewpoints. FIG. 26A and FIG. 26B respectively illustrate the case where image display directed to two viewpoints is performed similarly to Embodiment 1 and the case where image display directed to eight viewpoints is performed unlike Embodiment 1.

In the case of image display directed to two viewpoints illustrated in FIG. 26A, 3D display is performed regarding two sub pixels as one pixel, and a left eye image and a right eye image are alternately displayed in each of the sub pixels along the first direction x. Furthermore, in FIG. 26A, separation areas 3124 each having a forming width corresponding to two columns of sub pixels are formed in accordance with the display patterns of the parallax images on the display panel 311.

Meanwhile, in the case of image display directed to eight viewpoints illustrated in FIG. 26B, 3D display is performed regarding eight sub pixels as one pixel, and each of the images directed to the eight viewpoints are displayed in each of the sub pixels along the first direction x. That is, the display panel 311 displays an image for first viewpoint, an image for second viewpoint, an image for third viewpoint, an image for fourth viewpoint . . . on each of the sub pixels one after another. The display device 310 further forms on the liquid crystal lens a separation area 3124 having a width corresponding to eight columns of sub pixels along the first direction x in accordance with the display on the display panel 311. Thus, the image for each of the respective viewpoints is distributed to eight viewpoints as illustrated in FIG. 26B.

The display device 310 thus displays images depending the number of viewpoints on the display panel 311 and changes the forming width of the separation area 3124 according to the number of viewpoints. This makes it possible to perform 3D display directed to two viewpoints as well as multi viewpoints.

Figure 27C:
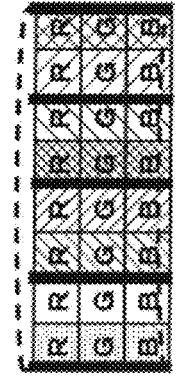
FIG. 27A to 27F depict a problem for a related art.
Figure 27F:
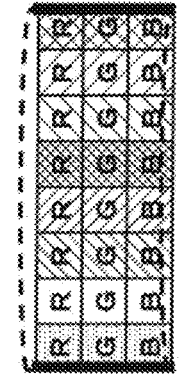
Figure 27B:
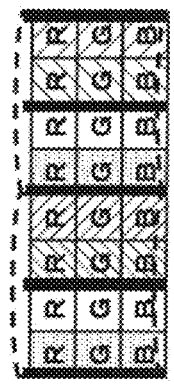
Figure 27E:
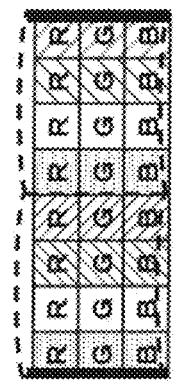
Figure 27A:
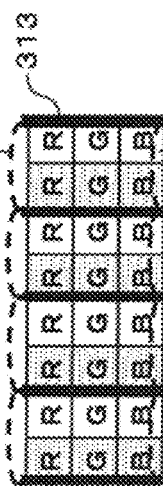
Figure 27D:
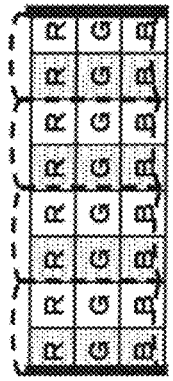

However, if the light blocking members 313 are provided in accordance with any one of the number of viewpoints, change in the number of viewpoints may lead to reduction in efficiency of utilization of emitted light and scattering of the emitted light. FIGS. 27A to 27F depict a problem for a related art. FIGS. 27A to 27C depict a case where light blocking members 313 placed at a pitch corresponding to two columns of sub pixels are provided in accordance with two viewpoints. FIGS. 27D to 27F depict a case where light blocking members 313 placed at a pitch corresponding to eight columns of sub pixels are provided in accordance with eight viewpoints. FIGS. 27A and 27D depict a case where image display directed to two viewpoints is performed, FIGS. 27B and 27E depict a case where image display directed to four viewpoints is performed, and FIGS. 27C and 27F depict a case where image display directed to eight viewpoints is performed.

As illustrated in FIG. 27A to FIG. 27C, in the case where the light blocking members 313 are provided at a pitch corresponding to two columns of sub pixels in accordance with two viewpoints, the boundaries between the separation areas 3124 are suitably blocked in FIG. 27A while the light emitted incident to the portions different from the boundaries between the separation area 3124 is also blocked in FIG. 27B and FIG. 27C. This causes reduction in efficiency of utilization of the light emitted from the display panel 311.

As illustrated in FIGS. 27D to 27F, in the case where the light blocking members 313 are provided at a pitch corresponding to eight columns of sub pixels in accordance with eight viewpoints, the boundaries between the separation areas 3124 are suitably blocked in FIG. 27F while the boundaries between the separation areas 3124 that are not blocked by the light blocking areas 313 exist in FIG. 27D and FIG. 27E. This may cause scatter of light emitted from the display panel 311 and degradation in display characteristics.

Hereupon, in the present embodiment, by utilizing the light blocking unit 13 in place of the light blocking member 313 and by dynamically controlling the array pitch of the light blocking area 136 depending on the number of viewpoints, the above-described problems are solved.

Figure 28B:
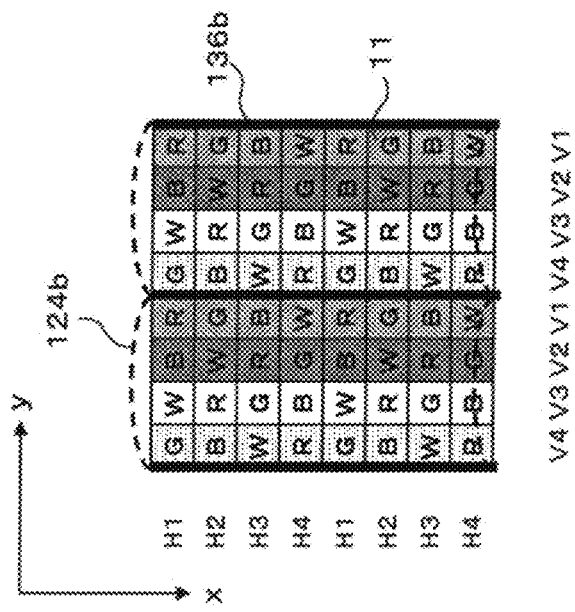
FIG. 28A and FIG. 28B simply depict image display directed to four viewpoints.
Figure 28A:
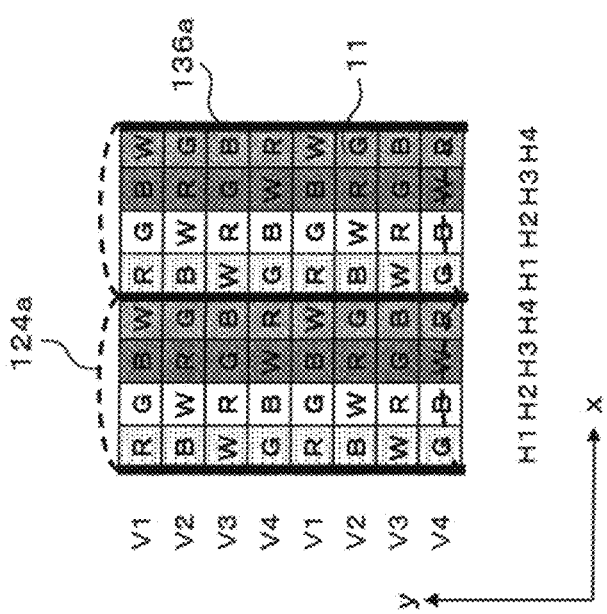

FIG. 28A to FIG. 29B simply depict image display directed to four viewpoints. In FIG. 28A to FIG. 29B, each pixel consists of sub pixels of 4×4. In the configuration in FIG. 28A to FIG. 29B, the display panel 11 displays an image for each viewpoint at a pitch corresponding to one column of a sub pixel. In the case of the landscape form, for example, as illustrated in FIG. 28A and FIG. 29A, the display panel 11 displays an image for first viewpoint, an image for second viewpoint, an image for third viewpoint and an image for fourth viewpoint one after another along the first direction x. For example, the image for the first viewpoint is displayed in the column H1, the image for second viewpoint is displayed in the column H2, the image for third viewpoint is displayed in the column H3, and the image for the fourth viewpoint is displayed in the column H4.

The distribution unit 12 and the light blocking unit 13 respectively form the separation areas 124 and the light blocking areas 136 depending on the number of viewpoints. In the case of displaying in a landscape form, for example, the distribution unit 12 forms multiple separation areas 124 extending along the second direction y each having a width corresponding to four columns of sub pixels as illustrated in FIG. 28A. Furthermore, the light blocking unit 13 forms multiple light blocking areas 136 extending along the second direction y placed at an array pitch corresponding to four columns of sub pixels at the boundary portions between the separation areas 124. By the above configuration, the light emitted from each of the parallax images displayed on each pixel is distributed to four viewpoints. This makes it possible to display separate images for multi viewpoints. Example is that two observers can recognize separate stereoscopic images, for example.

Figure 29A:
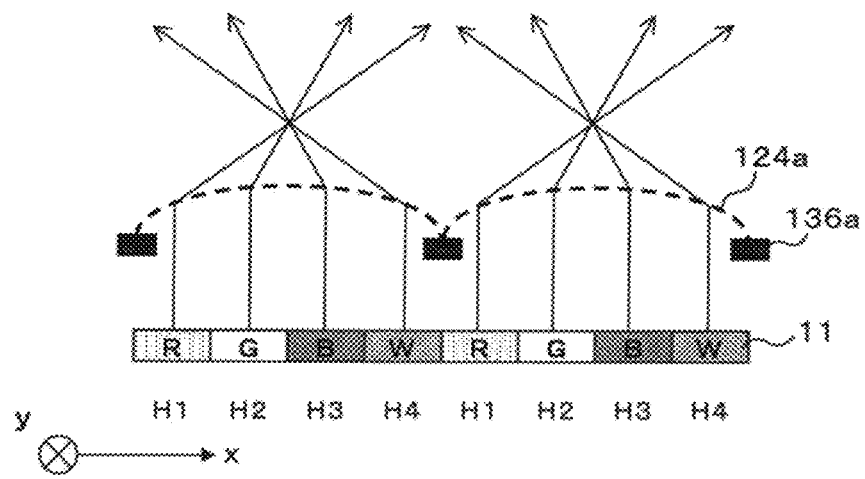
FIG. 29A and FIG. 29B simply depict image display directed to four viewpoints.
Figure 29B:
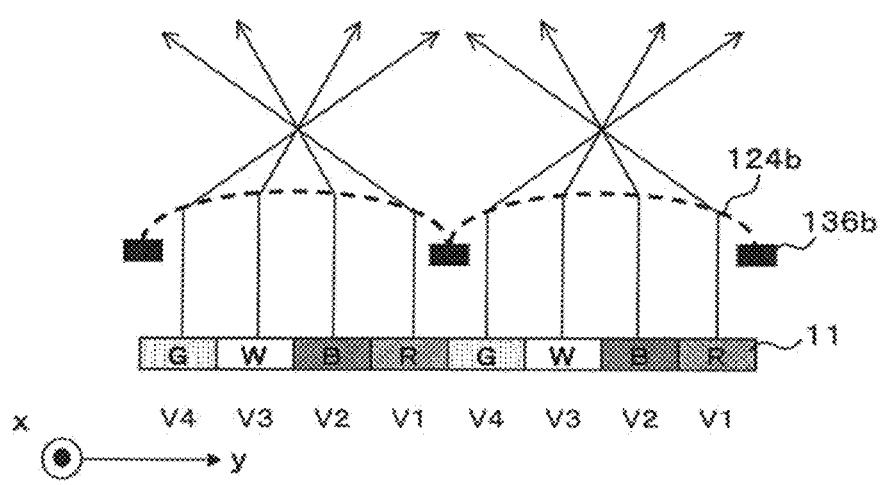

In addition, similarly to Embodiment 1, the display device 10 performs switching of the display orientation according to the posture of its own apparatus. That is, if the apparatus switches from the horizontal posture to the vertical posture, the display form of the display panel 11 is switched from the landscape form to the portrait form to thereby cause the display panel 11 to alternately display parallax images along the second direction y as illustrated in FIG. 28B and FIG. 29B. In this case, the distribution unit 12 and the light blocking unit 13 respectively switch the extending directions of the separation areas 124 and the light blocking areas 136 from the second direction y to the first direction x.

Figure 30A:
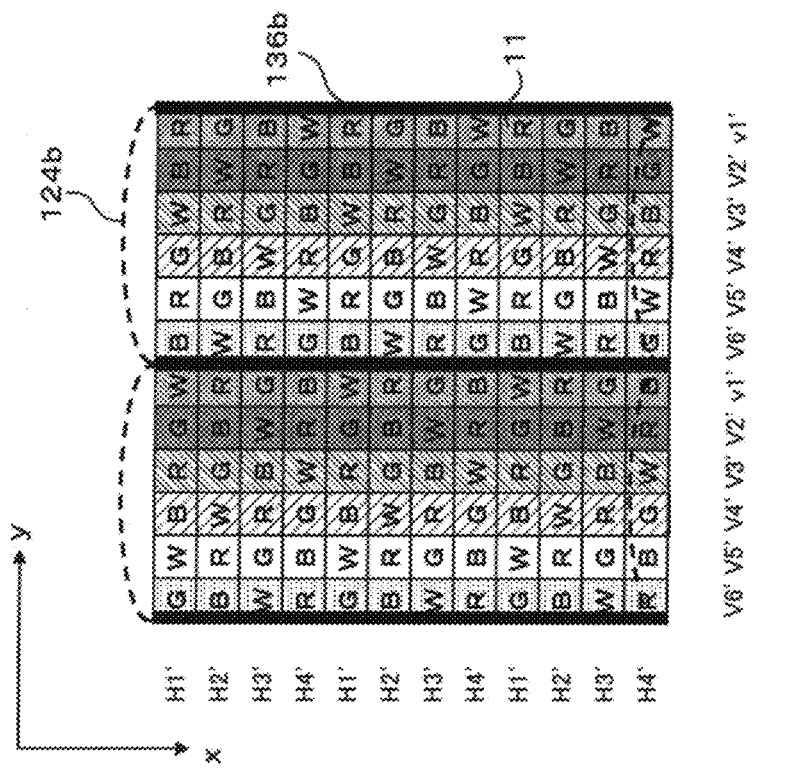
FIG. 30A and FIG. 30B are illustrative views when image display directed to multi viewpoints is made.
Figure 30B:
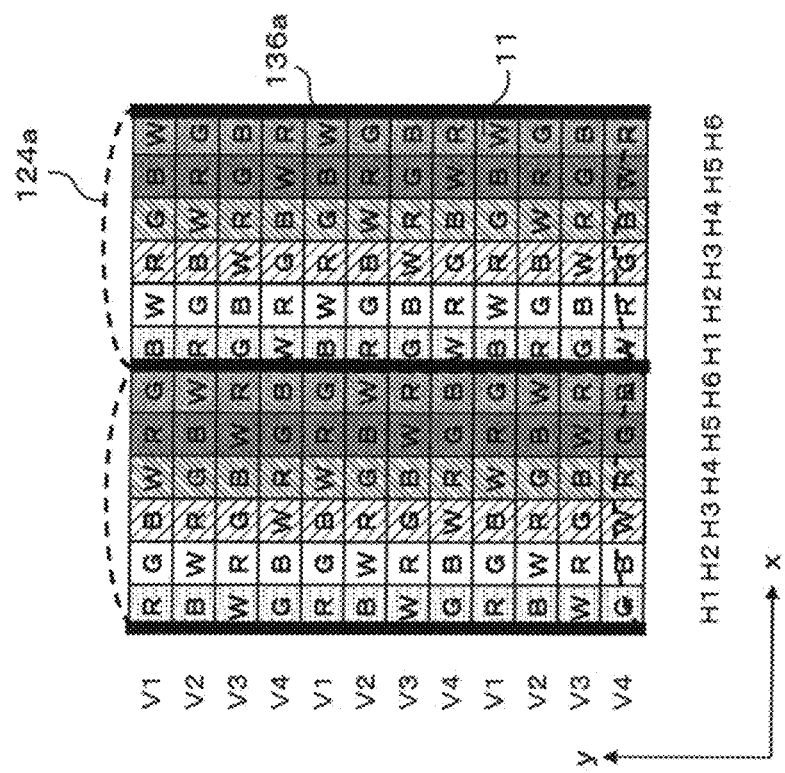
Figure 31A:
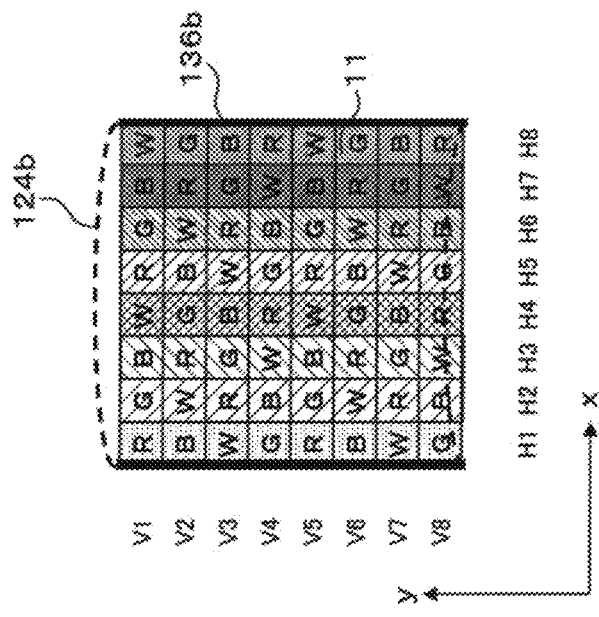
FIG. 31A and FIG. 31B are illustrative views when image display directed to multi viewpoints is made.
Figure 31B:
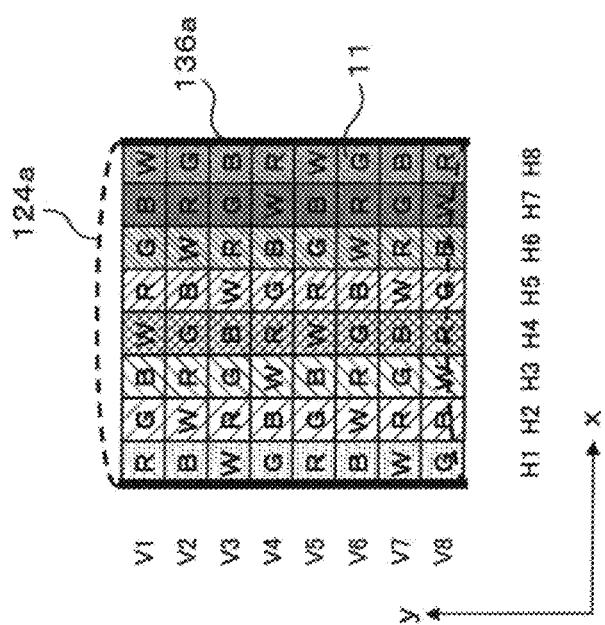
Figure 32A:
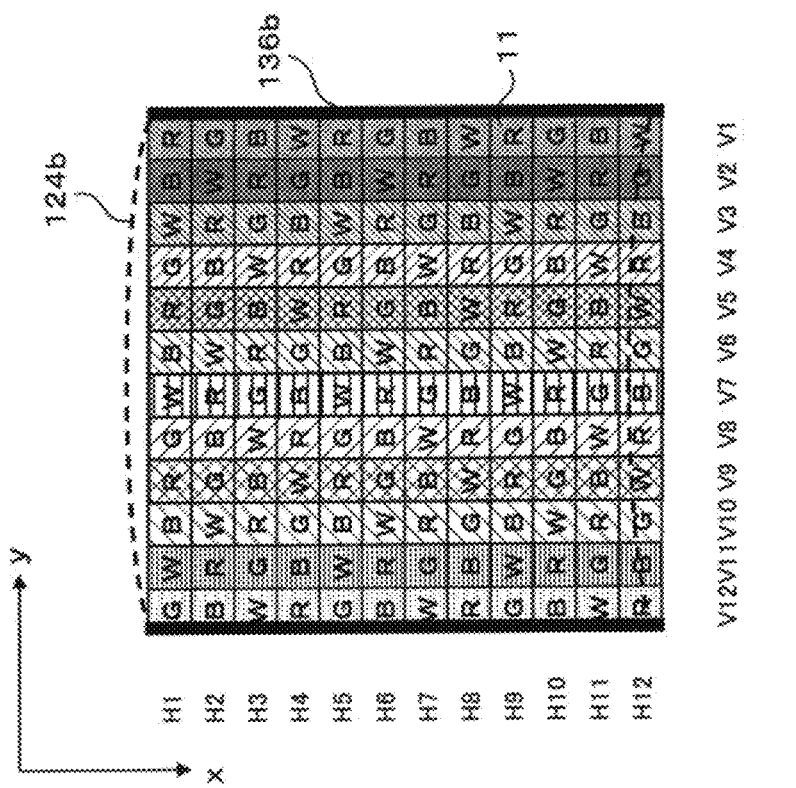
FIG. 32A and FIG. 32B are illustrative views when image display directed to multi viewpoints is made.
Figure 32B:
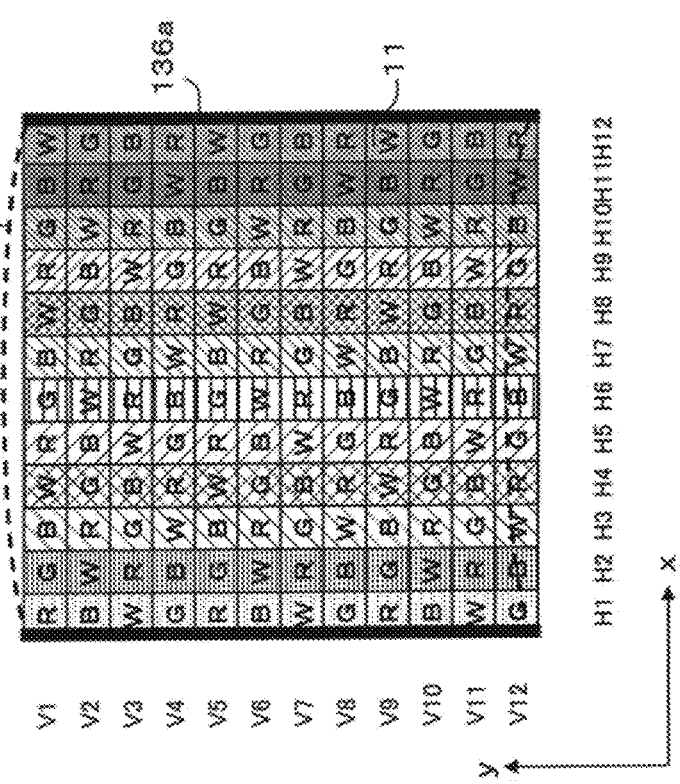

FIG. 30A to FIG. 32B are illustrative views when image display directed to multi viewpoints is made. FIG. 30A and FIG. 30B illustrate an example of configuration when image display directed to six viewpoints is performed, FIG. 31A and FIG. 31B illustrate an example of configuration when image display directed to eight viewpoints is performed, and FIG. 32A and FIG. 32B illustrate an example of configuration when image display directed to twelve viewpoints is performed. In FIG. 30A and FIG. 30B, each pixel consists of sub pixels of 6×4. In FIG. 31A and FIG. 31B, each pixel consists of sub pixels of 8×8. Note that sub pixels of 8×4, for example, may be regarded as a pixel unit in FIG. 31A and FIG. 31B. In FIG. 32A and FIG. 32B, each pixel consists of sub pixels of 12×12. Note that sub pixels of 12×4 may be regarded as a pixel unit in FIG. 32A and FIG. 32B.

Even in the configuration illustrated in FIG. 30A to FIG. 32B, the display panel 11 display an image for each viewpoint at a pitch corresponding to one column of sub pixel. Furthermore, the distribution unit 12 adjusts the forming width of each separation area 124 depending on the number of viewpoints. In the case of six viewpoint display, for example, the distribution unit 12 forms each separation area 124 having a forming width of six columns of sub pixels. The same applies to eight viewpoint display and twelve viewpoint display. Meanwhile, the light blocking unit 13 adjusts the array pitch of each light blocking area 136 depending on the number of viewpoints. In the case of six viewpoint display, for example, the light blocking unit 13 forms the light blocking areas 136 placed at an array pitch corresponding to six columns of sub pixels.

Figure 33:
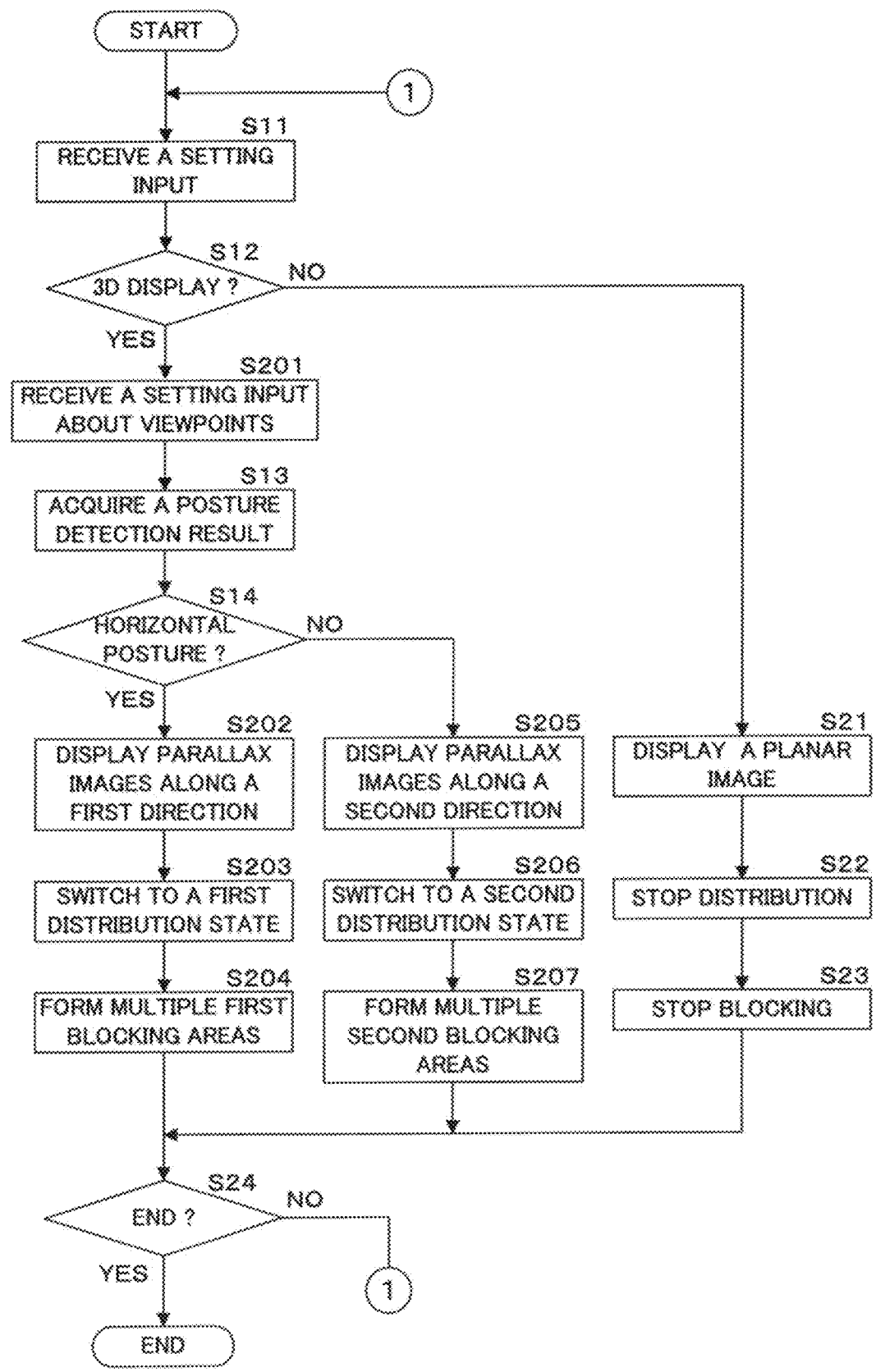
FIG. 33 is a flowchart depicting an example of a processing procedure to be executed by a control unit.

The display device 10 respectively drives the distribution unit 12 and the light blocking unit 13 according to the change in the number of viewpoints to thereby change the forming width of the separation area 124 and the forming position of the light blocking area 136 as described above. FIG. 33 is a flowchart depicting an example of a processing procedure to be executed by the control unit 21. The processing to be performed by the display device 10 will be described with reference to FIG. 33.

If it is determined that 3D display is performed (S12: YES), the control unit 21 of the display device 10 receives a setting input about the number of viewpoints via the reception unit 27, for example (step S201). The control unit 21 shifts the processing to step S13.

If it is determined that the horizontal posture is possible (S14: YES), the control unit 21 alternately displays a parallax image for each viewpoint along the first direction x depending on the number of viewpoints set at step S201 (step S202). That is, the control unit 21 displays an image for each viewpoint along the first direction x one after another as illustrated in FIG. 28A, etc. The control unit 21 switches the state of the distribution unit 12 to a first distribution state to cause the distribution unit 12 to form each first separation area 124*a* having a width depending on the number of viewpoints along the first direction x (step S203). Thus, the control unit 21 changes the width of each first separation area 124*a* along the first direction x depending on the number of viewpoints. The control unit 21 drives the light blocking unit 13 to form the first blocking area 136*a* at each boundary between the first separation areas 124*a* in correspondence to the changed width of the first separation area 124*a* (step S204).

If it is determined the horizontal posture is not possible (S14: NO), the control unit 21 alternately displays a parallax image for each viewpoint along the second direction y depending on the number of viewpoints set at step S201 (step S205). The control unit 21 switches the state of the distribution unit 12 to the second distribution state to cause the distribution unit 12 to form each second separation area 124*b* having a width depending on the number of viewpoints along the second direction y (step S206). That is, the control unit 21 changes the width of each second separation area 124*b* along the second direction y depending on the number of viewpoints. The control unit 21 drives the light blocking unit 13 to form the second blocking area 136*b* at each boundary between the second separation areas 124*b* in correspondence to the changed width of the second separation area 124*b* (step S207).

It is noted that description is made on display in the four primary colors, but it is needless to say that image display in the three primary colors may be possible as described using FIG. 22A to FIG. 23B or the like in Embodiment 1.

Hence, the boundary portions between the separation areas 124 are covered as illustrated in FIG. 16A and FIG. 16B while no light blocking areas extending along the first direction x are formed as illustrated in FIG. 28A, FIG. 29A to FIG. 32A in Embodiment 2 and no light blocking areas extending along the second direction y are formed as illustrated in FIG. 28B, FIG. 29B to FIG. 32B in Embodiment 2. Thus, similarly to the above description, occurrence of color moire and so on may be prevented even if the display device 10 performs image display directed to multi viewpoints more than two viewpoints.

Embodiment 3

In the present embodiment, description is made on the case where 3D display is performed depending on the position of the observer.

Figure 34:
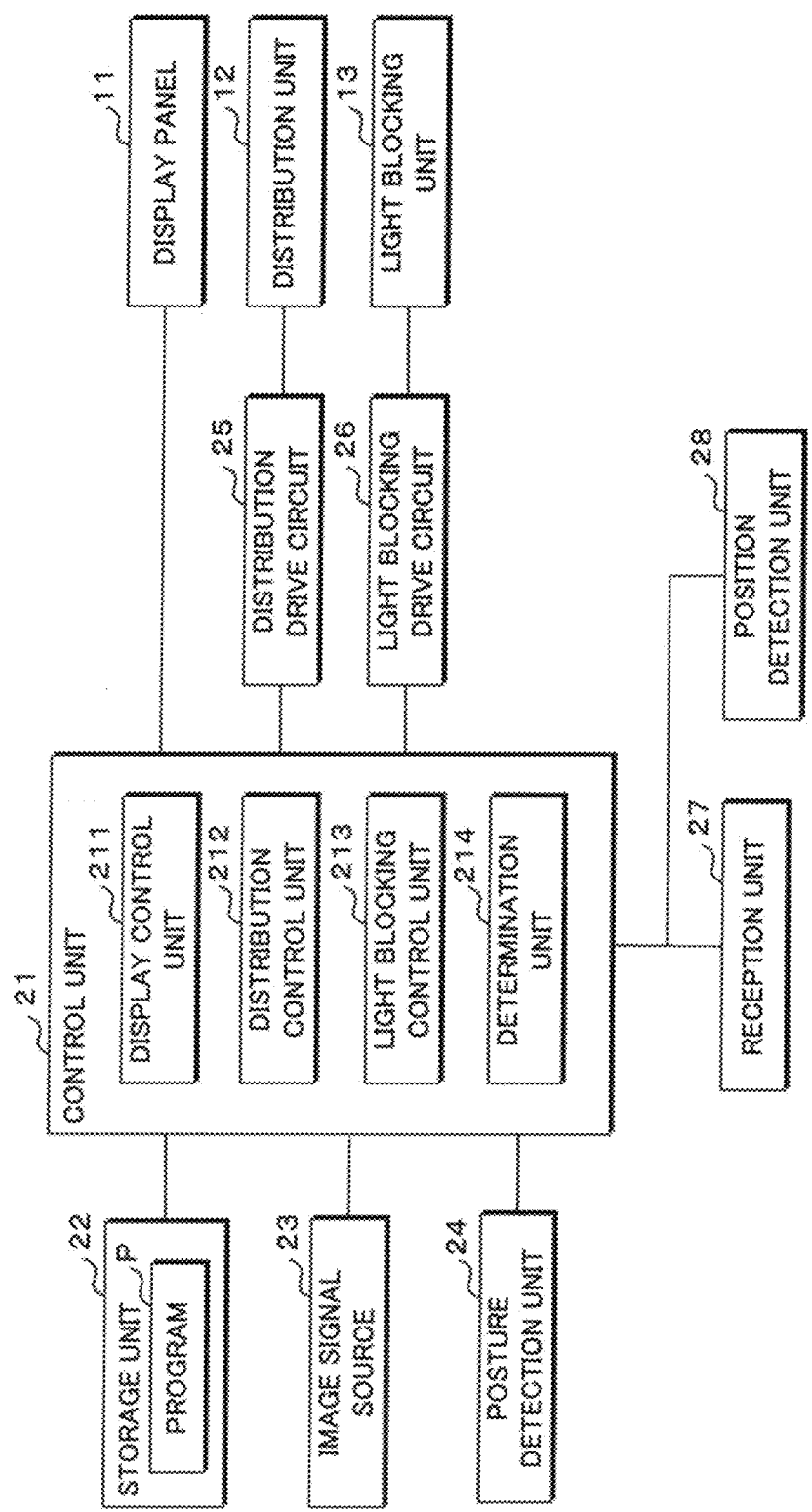
FIG. 34 is a block diagram illustrating an example of the configuration of a display device.

FIG. 34 is a block diagram illustrating an example of the configuration of the display device 10. The display device 10 according to the present embodiment is provided with a position detection unit 28. The position detection unit 28 includes a camera or the like for imaging the space in front of the electronic apparatus 1, for example, recognizes the positions of the eyes of the observer by image recognition processing, and applies the recognition result to the control unit 21.

Figure 35A:
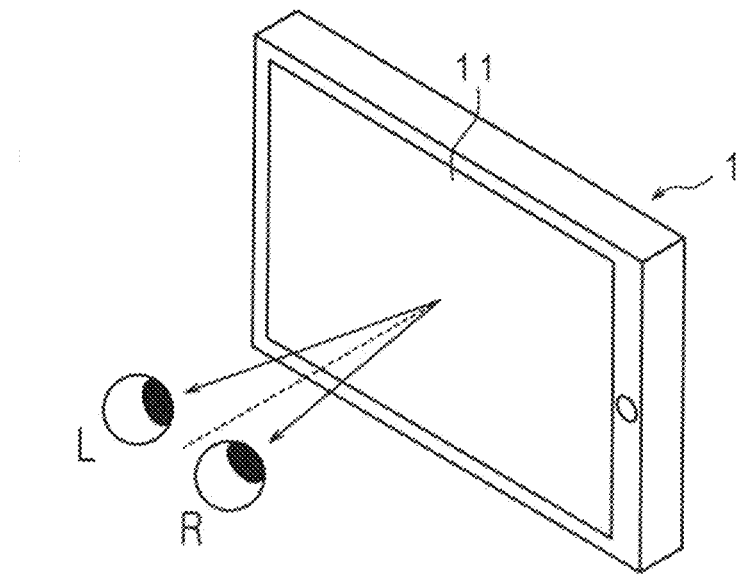
FIG. 35A and FIG. 35B depicts the outline of 3D display processing.
Figure 35B:
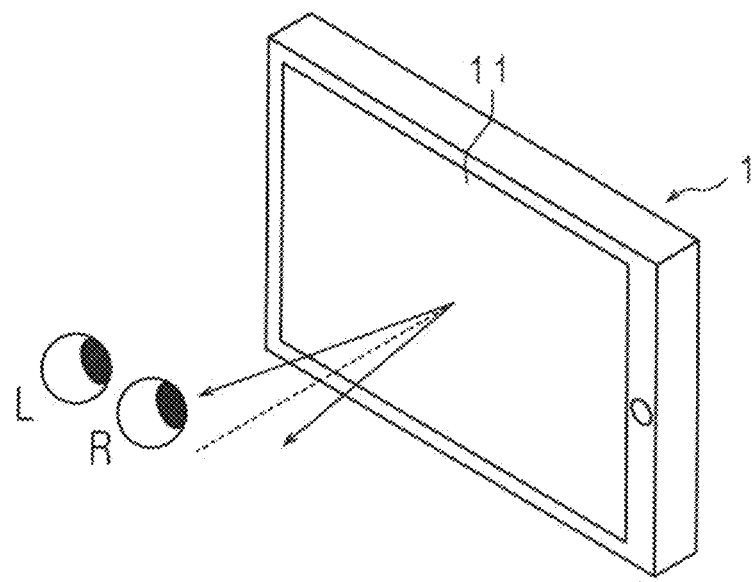

FIG. 35A and FIG. 35B depicts the outline of 3D display processing according to Embodiment 3. In a method of 3D display with naked eyes, the optimum position for the observer to observe parallax images is generally previously set. As illustrated in FIG. 35A, for example, the optimum observation position is set to the position in front of the display panel 11 at the center. As illustrated in FIG. 35B, if the position of the viewpoint of the observer is sifted from the optimum position, a problem in which light emitted not from a right eye image but from a left eye image may enter the right eye of the observer occurs. Thus, parallax images may not appropriately be perceived. According to the present embodiment, by controlling the separation direction of each parallax image depending on the position of the observer, the parallax image can appropriately be perceived even if the viewpoint of the observer is shifted from the optimum position.

According to the present embodiment, description will be made on a display device that performs light beam separation by the light blocking unit 13 without using the distribution unit 12 in order to reduce the switching time of the light beam separation direction, for example. That is, the display device 10 causes the light blocking unit 13 to function as an active parallax barrier.

Figure 36B:
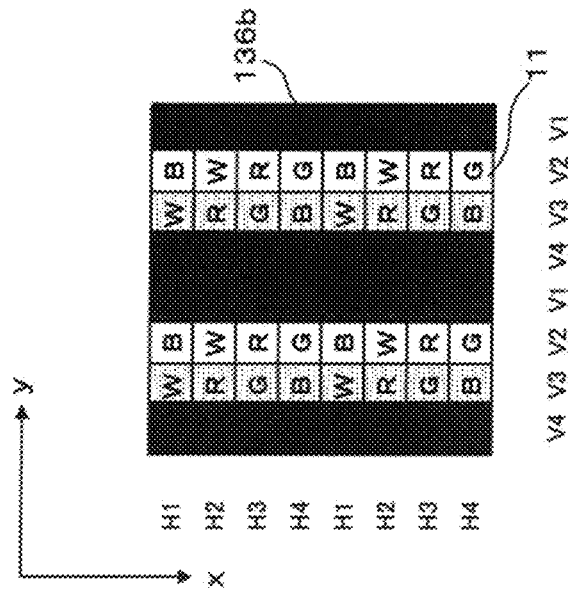
FIG. 36A and FIG. 36B simply depict 3D display.
Figure 36A:
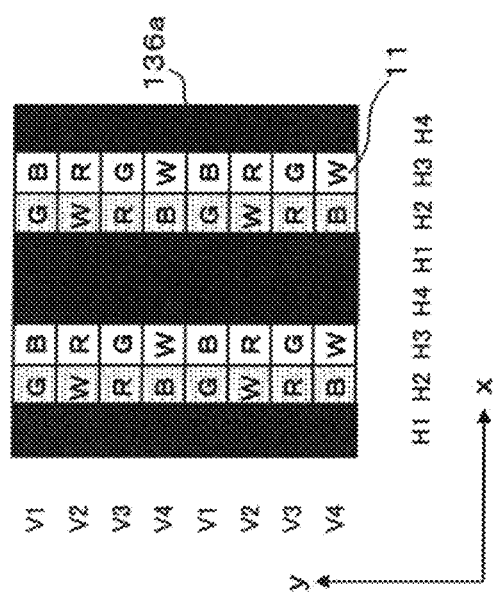

FIG. 36A and FIG. 36B simply depict 3D display according to Embodiment 3. FIG. 36A depicts a landscape form while FIG. 36B depicts a portrait form. Note that FIG. 36A and FIG. 36B illustrate a case where two viewpoint display is performed regarding sub pixels of 4×4 as a pixel unit.

In the present embodiment, the distribution unit 12 is switched to a third state where distribution of light emitted from each pixel is not performed. That is, the distribution unit 12 is set to a stopped state without being driven. Accordingly, the distribution unit 12 causes light incident from the back side to directly transmit toward the front side without forming the separation areas 124.

The light blocking unit 13 forms a light blocking area 136 wider than the light blocking area 136 according to Embodiment 1 and covers a part of each pixel in front view. More specifically, the light blocking unit 13 changes the forming width along the first direction x or the second direction y different from the extending direction of the light blocking area 136. In the case of a landscape form illustrated in FIG. 36A, for example, the light blocking unit 13 forms the first light blocking area 136*a* with a forming width corresponding to two columns of sub pixels along the first direction x.

That is, the light blocking unit 13 forms the first light blocking area 136*a* with about half the width of a pixel. This makes each pixel half covered and half exposed along the first direction x. In other words, a slit is formed between the blocking areas 136. In the case of 3D display in the portrait form, the light blocking unit 13 changes the forming width of the sub pixels along the second direction y to the width corresponding to two columns of sub pixels to thereby form the second light blocking area 136*b*.

Figure 37A:
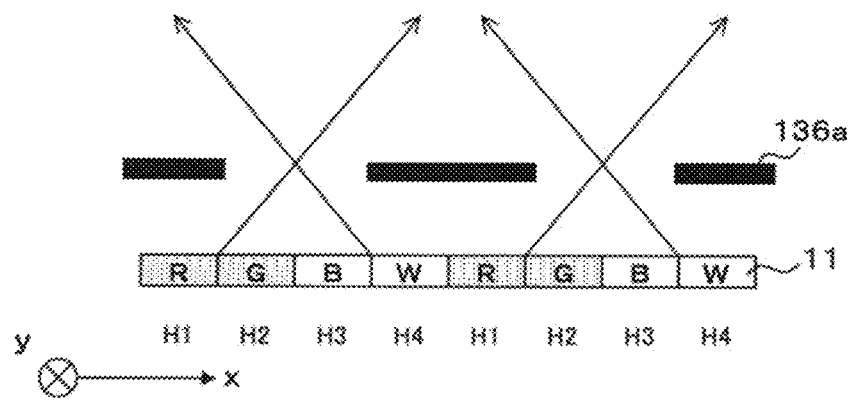
FIG. 37A and FIG. 37B illustrate a state where the forming positions of light-blocking areas are switched depending on the position of the viewpoint of an observer.
Figure 37B:
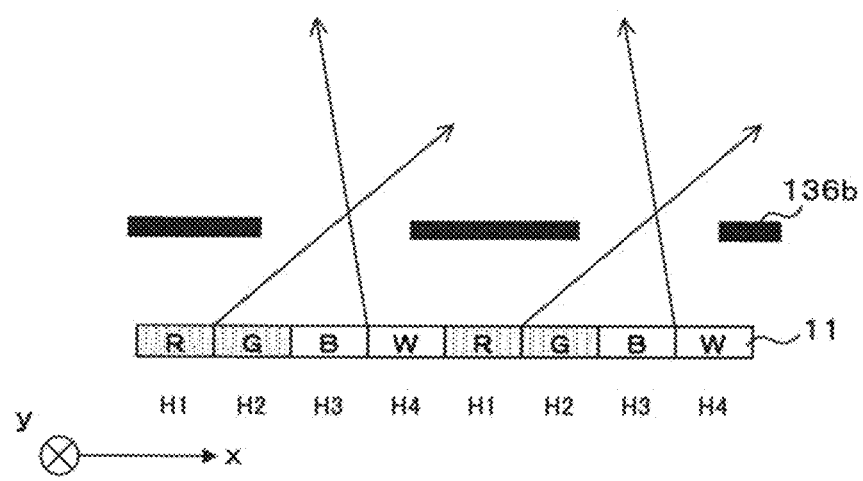

FIG. 37A and FIG. 37B illustrate states where the forming position of the light blocking areas 136 are switched depending on the positions of the viewpoints of the observers. Note that FIGS. 37A and 37B illustrate only the case of display in a landscape form. As described above, the light blocking unit 13 changes the forming width of each light blocking area 136 to thereby form a slit between the light blocking areas 136. Thus, as illustrated in FIG. 37A, light from each of the sub pixels displaying the right eye image and left eye image is distributed to two directions through a slit between the light blocking areas. Thus, the display device 10 causes the light blocking unit 13 to function as an active parallax barrier to perform light beam separation.

In addition, the light blocking unit 13 changes the forming position of the light blocking area 136 depending on the position of each observer. More specifically, as illustrated in FIG. 37A and FIG. 37B, the light blocking unit 13 changes the forming position of the light blocking area 136 relative to each pixel. In both of the configurations illustrated in FIG. 37A and FIG. 37B, the forming width of the light blocking area 136 along the first direction x is about one half of a pixel. However, the forming positions of the light blocking areas 136 are different between FIG. 37A and FIG. 37B. More specifically, the light blocking area 136 in FIG. 37B is changed to a position toward the right in the drawing as compared with that in FIG. 37A. Thus, the separation direction of the emitted light concerning each parallax image is changed toward the right as illustrated in FIG. 37B as compared with FIG. 37A. The control unit 21 changes the forming position of the light blocking area 136 as depicted in FIG. 37B if it is determined that the position of the viewpoint of the observer are positioned toward the right. Thus, the control unit 21 controls the light beam separation direction of each of the parallax images by the light blocking unit 13 depending on the position of the observer.

Figure 38A:
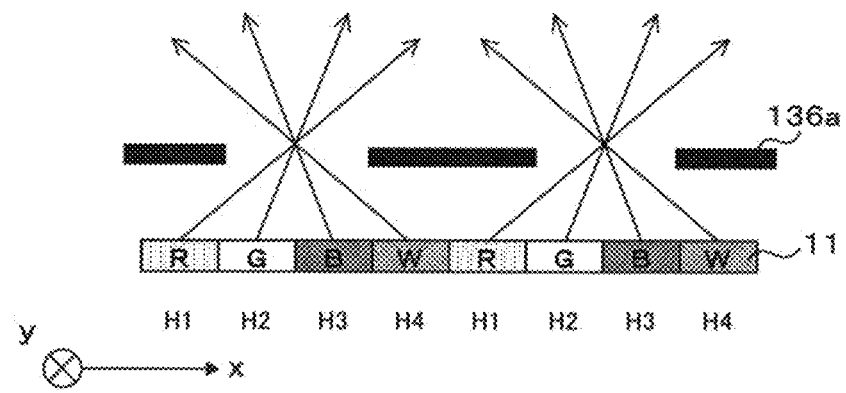
FIG. 38A and FIG. 38B depict 4-viewpoint display.
Figure 38B:
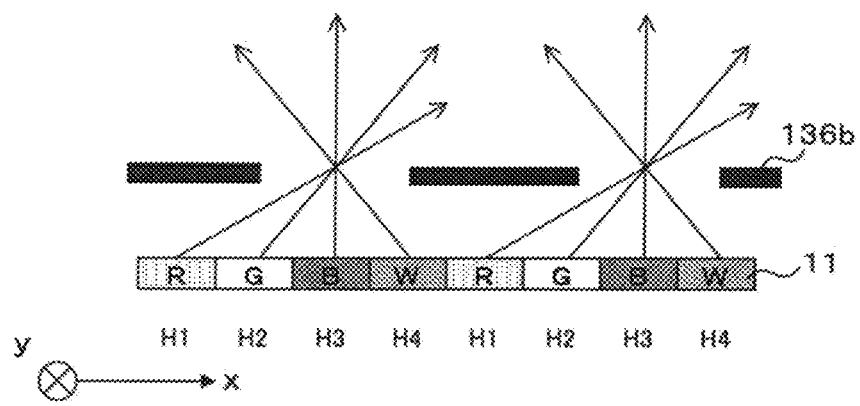

FIG. 38A and FIG. 38B depict four viewpoint display according to Embodiment 3. Note that FIG. 38A and FIG. 38B illustrate the case of a landscape form. FIG. 38A illustrates the case where each observer is in a position in front of the display panel 11 at the center while FIG. 38B illustrates the case where each observer is in a position toward the right in the drawing as compared with that in FIG. 38A. In the case of four viewpoint display in a landscape form, the display panel 11 alternately displays four patterns of parallax images along the first direction x similarly to Embodiment 1. In this case, the light blocking unit 13 changes the forming width and forming position of the light blocking area 136 depending on the position of the observer as described above. For example, as depicted in FIGS. 38A and 38B, the light blocking unit 13 forms the light blocking area 136 with half the width of an array pitch of each pixel. Note that in FIG. 37A to 38B, the forming width of the light blocking area 136 is the same in both of the cases of two viewpoints and four viewpoints but may be different depending on the number of viewpoints. Additionally, as depicted in FIG. 38A and FIG. 38B, the light blocking unit 13 changes the forming position of the light blocking area 136 depending on the position of the observer.

Thus, even in the multi viewpoints, the display device 10 enables 3D display depending on the position of the observer.

Figure 39:
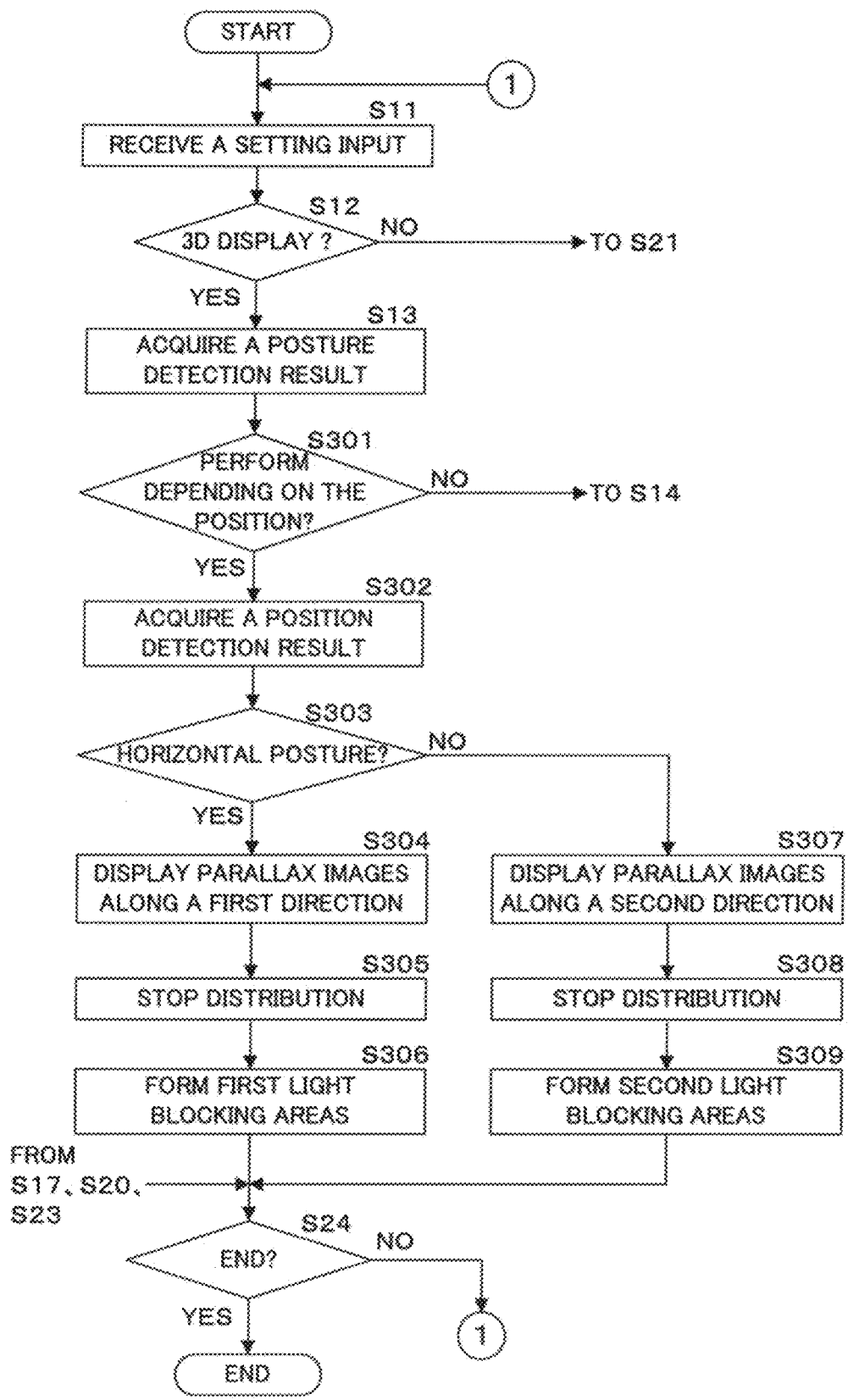
FIG. 39 is a flowchart depicting an example of a processing procedure to be executed by a control unit.

FIG. 39 is a flowchart depicting an example of a processing procedure to be executed by the control unit 21 according to Embodiment 3. After executing processing for detecting the posture of its own apparatus by the posture detection unit 24 (step S13), the control unit 21 of the display device 10 executes the following processing. The control unit 21 determines whether or not 3D display is performed depending on the position of the observer (step S301). For example, the control unit 21 receives a setting input about whether dynamic display control is to be performed at the time of receiving the operation concerning step S11. The control unit 21 performs determination according to the content of the setting. If it is determined that 3D display depending on the position of the observer is not performed (S301: NO), the control unit 21 shifts the processing to step S14.

If it is determined that 3D display depending on the position of the observer is performed (S301: YES), the control unit 21 acquires the detection result acquired by detecting the position of the observer from the position detection unit 28 (step S302). For example, the control unit 21 acquires the processing result of image recognition processing by the position detection unit 28. The control unit 21 determines whether or not the apparatus is placed in the horizontal posture (step S303). If it is determined the horizontal posture is possible (S303: YES), the control unit 21 sets the display state of the display panel 11 to the first display state and alternately displays parallax images along the first direction x (step S304).

The control unit 21 stops driving control on the distribution unit 12 to stop distributing light emitted from each pixel (step S305). That is, the control unit 21 does not drive the distribution unit 12 so as not to form the separation area 124. Thus, the light emitted from the display panel 11 is not separated by the distribution unit 12.

The control unit 21 stops distributing the emitted light by the distribution unit 12 and then causes the light blocking unit 13 to form the first light blocking area 136*a* by changing the forming width and the forming position along the first direction x depending on the position of the observer detected by the position detection unit 28 (step S306). More specifically, the control unit 21 selects the electrode 134 to be applied with voltage depending on the position of the observer and controls the forming width of the first light blocking area 136*a* along the first direction x. Furthermore, the control unit 21 controls the forming position of the light blocking area 136 relative to each pixel depending on the position of the observer. Thus, the control unit 21 causes the light blocking unit 13 to function as an active parallax barrier to thereby dynamically control the light beam separation direction concerning parallax images. The control unit 21 shifts the processing to step S24.

If it is determined that the horizontal posture is not possible (S303: NO), the control unit 21 sets the display state of the display panel 11 to the first display state to thereby alternately display parallax images along the second direction y (step S307). The control unit 21 stops distributing the emitted light by the distribution unit 12 (step S308). The control unit 21 stops distributing the emitted light and then causes the light blocking unit 13 to form the second light blocking area 136*b* by changing the forming width and the forming position of the second light blocking area 136*b* along the second direction y depending on the position of the observer detected by the position detection unit 28 (step S309). The control unit 21 shifts the processing to step S24.

Hence, according to Embodiment 3, the separation direction of the emitted light concerning each parallax image can be controlled depending on the position of the observer, which increases the flexibility as to the position of the viewpoint of the observer.

It is to be noted that, as used herein and in the appended claims, the singular forms "a," "an," and "the" include plural referents unless the context clearly dictates otherwise.

It is to be noted that the disclosed embodiment is illustrative and not restrictive in all aspects. The scope of the present invention is defined by the appended claims rather than by the description preceding them, and all changes that fall within metes and bounds of the claims, or equivalence of such metes and bounds thereof are therefore intended to be embraced by the claims.

What is claimed is:

1. A display device, comprising:
   a display panel including a plurality of pixels that are arrayed along a first direction and a second direction and that are configured to display a parallax image or a planar image;
   a distribution unit that distributes light emitted from each pixel that is configured to display a parallax image corresponding to each of a plurality of viewpoints; and
   a light blocking unit that is disposed between the display panel and the distribution unit and that blocks part of the emitted light,
   wherein the distribution unit distributes light emitted from each of the pixels to each of the plurality of viewpoints along a direction tilted from the first direction in a first display state where the display panel displays a parallax image, or stops distributing emitted light in a second display state where the display panel displays a planar image, and
   in the first display state, the light blocking unit forms a plurality of first light blocking areas arranged along the direction tilted from the first direction, one of the first light blocking areas that blocks part of the emitted light extending along a direction tilted from the second direction, and
   in the second display state, the light blocking unit stops forming the first light blocking areas.

2. The display device according to claim 1, wherein
   the distribution unit forms, along the direction tilted from the first direction, a plurality of first separation areas each extending along the direction tilted from the second direction in a case of the first display state, and
   the light blocking unit forms each of the first light blocking areas at each boundary between the first separation areas in a case of the first display state.

3. The display device according to claim 2, wherein
   the distribution unit is a liquid crystal lens forming a lenticular-lens-like refractive index profile extending in the direction tilted from the second direction, and the liquid crystal lens being formed at each of the first separation areas, and
   the boundary is a boundary between adjacent two of the liquid crystal lenses.

4. The display device according to claim 2, wherein
   the distribution unit changes a width in the direction tilted from the first direction of each of the first separation areas depending on the number of viewpoints in the first display state, and
   the light blocking unit forms each of the first light blocking areas at each boundary between the first separation areas in correspondence to the width of the first separation area after change.

5. The display device according to claim 1, wherein
   the distribution unit switches between a first distribution state where light emitted from each of the pixels is distributed to each of the plurality of viewpoints along the direction tilted from the first direction and a second distribution state where light emitted from each of the pixels is distributed to each of the plurality of viewpoints along the direction tilted from the second direction, and
   the light blocking unit forms, along the direction tilted from the first direction, a plurality of first light blocking areas extending along the direction tilted from the second direction that block part of the emitted light in the first distribution state and the first display state, and forms, along the direction tilted from the second direction, a plurality of second light blocking areas extending along the direction tilted from the first direction that block part of the emitted light in the second distribution state and the first display state.

6. The display device according to claim 5, wherein
   the distribution unit forms, along the direction tilted from the first direction, the plurality of first separation areas extending along the direction tilted from the second direction in the first distribution state, and forms, along the direction tilted from the second direction, a plurality of second separation areas extending along the direction tilted from the first direction in the second distribution state, and
   the light blocking unit forms each of the first light blocking areas at each boundary between the first separation areas in the first distribution state, and forms each of the second light blocking areas at each boundary between the second separation areas in the second distribution state.

7. The display device according to claim 5, further comprising a posture detection unit that detects a posture of an apparatus including the display device, wherein
   the distribution unit switches between the first distribution state and the second distribution state depending on the posture detected by the posture detection unit.

8. The display device according to claim 1, wherein
   each of the pixels includes a plurality of sub pixels that are separated by a plurality of primary colors and arrayed along the first direction and the second direction, and
   the plurality of sub pixels aligned along the first direction or the second direction are equal in number for each of the different colors within each of the pixels.

9. The display device according to claim 8, wherein the sub pixels adjacent to each other along the first direction and the second direction have different colors from each other.

10. The display device according to claim 1, wherein the light blocking unit is a liquid crystal barrier comprising two sheets of transparent substrates that face each other, a liquid crystal layer sealed between facing surfaces of the transparent substrates and an electrode arranged on at least one of the facing surfaces, the liquid crystal barrier aligning liquid crystal molecules in the liquid crystal layer based on voltage applied from an external source to the electrode and forming the first light blocking areas extending along the direction tilted from the second direction.

11. The display device according to claim 1, wherein the first direction and the second direction are perpendicular to each other.

12. The display device according to claim 1, further comprising a position detection unit that detects a position of an observer, wherein the distribution unit stops distributing the emitted light, and the light blocking unit changes a forming width and a forming position of the first light blocking areas along the direction tilted from the first direction depending on the position of the observer detected by the position detection unit after stopping distribution of the emitted light in the first display state.

13. An electronic apparatus equipped with the display device according to claim 1.

14. A display method for causing a display device to execute processing, the display device including a display panel including a plurality of pixels that are arrayed along a first direction and a second direction and that are configured to display a parallax image or a planar image, a distribution unit that distributes light emitted from each pixel configured to display a parallax image corresponding to each of a plurality of viewpoints, and a light blocking unit that is disposed between the display panel and the distribution unit and that blocks part of the emitted light, the display device executing processing of:

distributing light emitted from each of the pixels to the plurality of viewpoints along the direction tilted from the first direction in a first display state where the display panel displays a parallax image, or stopping distribution of emitted light in a second display state where the display panel displays a planar image, by the distribution unit;

in the first display state, forming, by the light blocking unit, a plurality of first light blocking areas arranged along the direction tilted from the first direction and extending along the direction tilted from the second direction to block part of the emitted light; and in the second display state, stopping formation of the first light blocking areas.

* * * * *